US012546652B2

(12) United States Patent
Yin et al.

(10) Patent No.: US 12,546,652 B2
(45) Date of Patent: Feb. 10, 2026

(54) LIGHT DETECTION MODULE, LIGHT DETECTION METHOD AND DISPLAY DEVICE

(71) Applicant: BOE TECHNOLOGY GROUP CO., LTD., Beijing (CN)

(72) Inventors: Xinshe Yin, Beijing (CN); Hui Zhao, Beijing (CN); Xinbin Han, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 355 days.

(21) Appl. No.: 17/927,109

(22) PCT Filed: Nov. 26, 2021

(86) PCT No.: PCT/CN2021/133718
§ 371 (c)(1),
(2) Date: Nov. 22, 2022

(87) PCT Pub. No.: WO2023/092503
PCT Pub. Date: Jun. 1, 2023

(65) Prior Publication Data
US 2024/0125648 A1 Apr. 18, 2024

(51) Int. Cl.
G01J 1/46 (2006.01)
G01J 1/44 (2006.01)
(52) U.S. Cl.
CPC ............ G01J 1/46 (2013.01); *G01J 2001/446* (2013.01)
(58) Field of Classification Search
None
See application file for complete search history.

(56) References Cited

U.S. PATENT DOCUMENTS 6,054,703 A * 4/2000 Liu .................... H04N 25/7795
348/311
2007/0262238 A1 11/2007 Takashima et al.
(Continued)

FOREIGN PATENT DOCUMENTS

CN 1209930 A 3/1999
CN 101231189 A 7/2008
(Continued)

*Primary Examiner* — Andre L Matthews
(74) *Attorney, Agent, or Firm* — Muncy, Geissler, Olds & Lowe, P.C.

(57) ABSTRACT

A light detection module, a light detection method and a display device are provided. The light detection module includes N light sensing circuits, a control circuit, a capacitance integrating conversion circuit, and a processing circuit; N is a positive integer; wherein the N light sensing circuits respectively sense light signals of different colors to generate corresponding photocurrents; the control circuit is configured to control to provide photocurrents generated by the light sensing circuits to a capacitance integrating amplifying circuit in a time division manner, and to control a conversion parameter of the capacitance integrating amplifying circuit; the capacitance integrating conversion circuit is configured to perform integrating conversion on the photocurrent according to the conversion parameter and an integration time, to obtain an analog output voltage; the processing circuit is configured to obtain characteristics of the light signal according to the analog output voltage. In the present disclosure, the current integration method is adopted by the capacitance integration conversion circuit, and the photocurrent is converted according to the integration time, so that the number and area of the photodiodes connected in parallel in the light sensing circuit can be reduced by increasing the integration time, the space and cost are reduced.

15 Claims, 5 Drawing Sheets

(56) References Cited

U.S. PATENT DOCUMENTS

| | | | |
|---|---|---|---|
| 2010/0245309 A1 | 9/2010 | Matsuki | |
| 2013/0181111 A1* | 7/2013 | Jahana | G01J 1/46 250/206 |
| 2017/0303803 A1 | 10/2017 | He et al. | |
| 2017/0328767 A1 | 11/2017 | Zheng | |
| 2019/0104247 A1 | 4/2019 | Feng et al. | |
| 2019/0120687 A1 | 4/2019 | Ding et al. | |

FOREIGN PATENT DOCUMENTS

| | | |
|---|---|---|
| CN | 201509229 U | 6/2010 |
| CN | 101846550 A | 9/2010 |
| CN | 103207013 A | 7/2013 |
| CN | 105953823 A | 9/2016 |
| CN | 106969832 A | 7/2017 |
| CN | 107393457 A | 11/2017 |
| CN | 107580185 A | 1/2018 |

* cited by examiner

LIGHT DETECTION MODULE, LIGHT DETECTION METHOD AND DISPLAY DEVICE

CROSS-REFERENCE TO RELATED APPLICATION

This application is the U.S. national phase of PCT Application No. PCT/CN2021/133718 filed on Nov. 26, 2021, which is incorporated herein by reference in its entirety.

TECHNICAL FIELD

The present disclosure relates to the field of light detection technology, in particular to a light detection module, a light detection method and a display device.

BACKGROUND

A relative light detection module can detect a wide range of photocurrent values, and the light sensing circuit needs to use multiple photodiodes connected in parallel to generate photocurrents with relatively large current values, resulting in high cost and occupying a large space.

SUMMARY

In a first aspect, a light detection module includes N light sensing circuits, a control circuit, a capacitance integrating conversion circuit, and a processing circuit; N is a positive integer; wherein the N light sensing circuits respectively sense light signals of different colors to generate corresponding photocurrents; the control circuit is configured to control to provide photocurrents generated by the light sensing circuits to a capacitance integrating amplifying circuit in a time division manner, and to control a conversion parameter of the capacitance integrating amplifying circuit; the capacitance integrating conversion circuit is configured to perform integrating conversion on the photocurrent according to the conversion parameter and an integration time, to obtain an analog output voltage; the processing circuit is configured to obtain characteristics of the light signal according to the analog output voltage.

Optionally, the capacitance integrating conversion circuit includes a conversion sub-circuit, a sampling sub-circuit, and a sampling control sub-circuit; the control circuit includes a light sensing control sub-circuit and a capacitor control sub-circuit; the sampling sub-circuit includes M integrating capacitors; M is a positive integer; the light sensing control sub-circuit is configured to control to provide the photocurrents generated by the light sensing circuits to an input end of the conversion sub-circuit in a time division manner under the control of a light sensing control signal; the capacitor control sub-circuit is configured to control to connect first ends of the integrating capacitors to the input end of the conversion sub-circuit in a time division manner under the control of a capacitor control signal; second ends of the integrating capacitors are electrically connected to an output end of the conversion sub-circuit; the sampling control sub-circuit is configured to control to connect or disconnect the output end of the conversion sub-circuit and the processing circuit under the control of the sampling control signal; the conversion sub-circuit is configured to convert the photocurrent to obtain and output an analog output voltage through the output end of the conversion sub-circuit; the conversion parameter is a capacitance value of an integrating capacitor currently in connection with the input end of the conversion sub-circuit.

Optionally, the light detection module further includes a reset circuit; wherein the reset circuit includes M reset sub-circuits; an mth reset sub-circuit is respectively electrically connected to a first end of an mth integrating capacitor, a second end of the mth integrating capacitor and a reset control end, and is configured to control to connect a first end of the mth integrating capacitor and a second end of the mth integrating capacitor under the control of a reset control signal provided by the reset control end, to release charge stored in the mth integrating capacitor; m is a positive integer less than or equal to M.

Optionally, the light sensing control sub-circuit includes N light sensing control transistors; the capacitor control sub-circuit includes M capacitor control transistors; n is a positive integer less than or equal to N, and m is a positive integer less than or equal to M; the sampling control sub-circuit includes a sampling switch and a storage capacitor; a control electrode of an nth light sensing control transistor is electrically connected to an nth light sensing control end, a first electrode of the nth light sensing control transistor is electrically connected to an nth photocurrent output end, and a second electrode of the nth light sensing control transistor is electrically connected to the input end of the conversion sub-circuit; the nth light sensing control end is used to provide an nth light sensing control signal; a control electrode of an mth capacitor control transistor is electrically connected to an mth capacitor control end, a first electrode of the mth capacitor control transistor is electrically connected to the input end of the conversion sub-circuit, and a second electrode of the mth capacitor control transistor is electrically connected to the first end of the mth integrating capacitor, the second end of the mth integrating capacitor is electrically connected to the output end of the conversion sub-circuit; the mth capacitor control end is used to provide the mth capacitor control signal; a control end of the sampling switch is electrically connected to the sampling control end, a first end of the sampling switch is electrically connected to the output end of the conversion sub-circuit, and a second end of the sampling switch is electrically connected to the processing circuit; a first end of the storage capacitor is electrically connected to the second end of the sampling switch, and a second end of the storage capacitor is electrically connected to a DC voltage end.

Optionally, the light detection module further includes a filter circuit; wherein the filter circuit is connected between the output end of the conversion sub-circuit and the first end of the sampling switch, and is configured to filter out a high-frequency noise in the analog output voltage, and provide the analog output voltage after filtering out the high-frequency noise to the first end of the sampling switch.

Optionally, the mth reset sub-circuit includes an mth reset transistor; a control electrode of the mth reset transistor is electrically connected to the reset control end, a first electrode of the mth reset transistor is electrically connected to the first end of the mth integration capacitor, and a second electrode of the mth reset transistor is electrically connected to the second end of the mth integrating capacitor.

Optionally, the N light sensing circuits, the light sensing control sub-circuit, the capacitor control sub-circuit, and the reset circuit are all arranged on a display substrate.

Optionally, a capacitance value of at least part of integrating capacitors is less than 10 pF, the at least part of integrating capacitors are arranged on the display substrate, and integrating capacitors other than the at least part of integrating capacitors included in the sampling sub-circuit are arranged on a circuit board or a driver integrated circuit.

Optionally, the conversion sub-circuit comprises an operational amplifier; an inverting input end of the operational amplifier is the input end of the conversion sub-circuit, an output end of the operational amplifier is the output end of the conversion sub-circuit; a non-inverting input end of the operational amplifier is electrically connected to a reference voltage end, and the reference voltage end is configured to provide a reference voltage.

Optionally, the light detection module further includes a control signal generating unit; wherein the control signal generating unit is configured to provide a sampling control signal, a light sensing control signal, a capacitor control signal and a reset control signal.

Optionally, the processing circuit comprises an analog-to-digital converter and an output processing unit; the analog-to-digital converter is configured to convert the analog output voltage into an output digital signal; the output processing unit is electrically connected to the analog-to-digital converter, and is configured to receive the output digital signal and obtain the characteristics of the light signal according to the output digital signal.

Optionally, the characteristics of the light signal include at least one of light intensity, brightness, color coordinates, or color temperature.

Optionally, the light detection module further includes a micro-control unit; wherein the control signal generating unit comprises a control signal generating circuit and a level converter; the control signal generating circuit is configured to provide a sampling control signal, an input light sensing control signal, an input capacitor control signal and an input reset control signal; the level converter is electrically connected to the control signal generating circuit, and is configured to perform level conversion on the input light sensing control signal to generate the light sensing control signal, perform the level conversion on the input capacitor control signal to generate the capacitor control signal, and perform the level conversion on the input reset control signal to generate the reset control signal; the output processing unit and the control signal generating circuit are arranged in the micro-control unit.

Optionally, the light detection module further comprises a filter circuit; the micro-control unit, the level converter, the analog-to-digital converter, the filter circuit, and the conversion sub-circuit and the sampling control sub-circuit included in the capacitance integration conversion circuit are all arranged on the circuit board or the driver integrated circuit.

Optionally, the nth light sensing circuit includes an nth photodiode; n is a positive integer less than or equal to N; a cathode of the nth photodiode is electrically connected to a power supply voltage end, and an anode of the nth photodiode is used to provide an nth photocurrent; the power supply voltage end is used to provide a power supply voltage signal.

In a second aspect, a light detection method is applied to the light detection module and includes: sensing, by the N light sensing circuits, sense the light signals of different colors respectively to generate corresponding photocurrents; controlling, by the control circuit, to provide the photocurrents generated by the light sensing circuits to the capacitance integrating amplifying circuit in a time division manner, and controlling a conversion parameter of the capacitance integrating amplifying circuit; converting, by the capacitance integration conversion circuit, the photocurrent according to the conversion parameter and the integration time to obtain the analog output voltage; obtaining, by the processing circuit, the characteristics of the light signal according to the analog output voltage.

Optionally, the control circuit comprises a light sensing control sub-circuit, a sampling sub-circuit and a capacitor control sub-circuit; the sampling sub-circuit comprises M integrating capacitors; M is a positive integer; the step of controlling, by the control circuit, to provide the photocurrents generated by the light sensing circuits to the conversion circuit in a time division manner includes: controlling, by the light sensing control sub-circuit, to provide the photocurrents generated by the light sensing circuits to the input end of the capacitance integrating conversion circuit in a time division manner under the control of the light sensing control signal; controlling, by the capacitor control sub-circuit, to connect the first ends of the integrating capacitors to the input end of the capacitance integrating conversion circuit in a time division manner under the control of the capacitor control signal; the conversion parameter is a capacitance value of the integrating capacitor currently connected to the input end of the capacitance integrating conversion circuit Optionally, the processing circuit comprises an analog-to-digital converter and an output processing unit; the step of obtaining, by the processing circuit, the characteristic of the light signal according to the analog output voltage include: converting, by the analog-to-digital converter, the analog output voltage into an output digital signal; obtaining, by the output processing unit, the characteristics of the light signal according to the output digital signal.

Optionally, a high-precision voltage conversion range of the analog-to-digital converter is greater than or equal to a first voltage VS1 and less than or equal to a second voltage VS2; the step of obtaining, by the output processing unit, characteristic of the light signal according to the output digital signal includes: determining, by the output processing unit, whether a voltage value of an input voltage corresponding to the output digital signal is within the high-precision voltage conversion range; wherein the input voltage is a voltage inputted to the analog-to-digital converter; when the output processing unit determines that the voltage value of the input voltage corresponding to the output digital signal is smaller than the first voltage VS1 or greater than the second voltage VS2, determining, by the output processing unit, that the voltage value of the input voltage corresponding to the output digital signal is not within the high-precision voltage conversion range, discarding the digital output signal; when the output processing unit determines that the voltage value of the input voltage corresponding to the output digital signal is greater than or equal to the first voltage VS1 and less than or equal to the second voltage VS2, determining, by the output processing unit, that the voltage value of the input voltage corresponding to the output digital signal is within the high-precision voltage conversion range, and obtaining, by the output processing unit, the characteristics of the light signal according to the digital output signal.

In a third aspect, a display device includes the light detection module.

DETAILED DESCRIPTION

Figure 1:
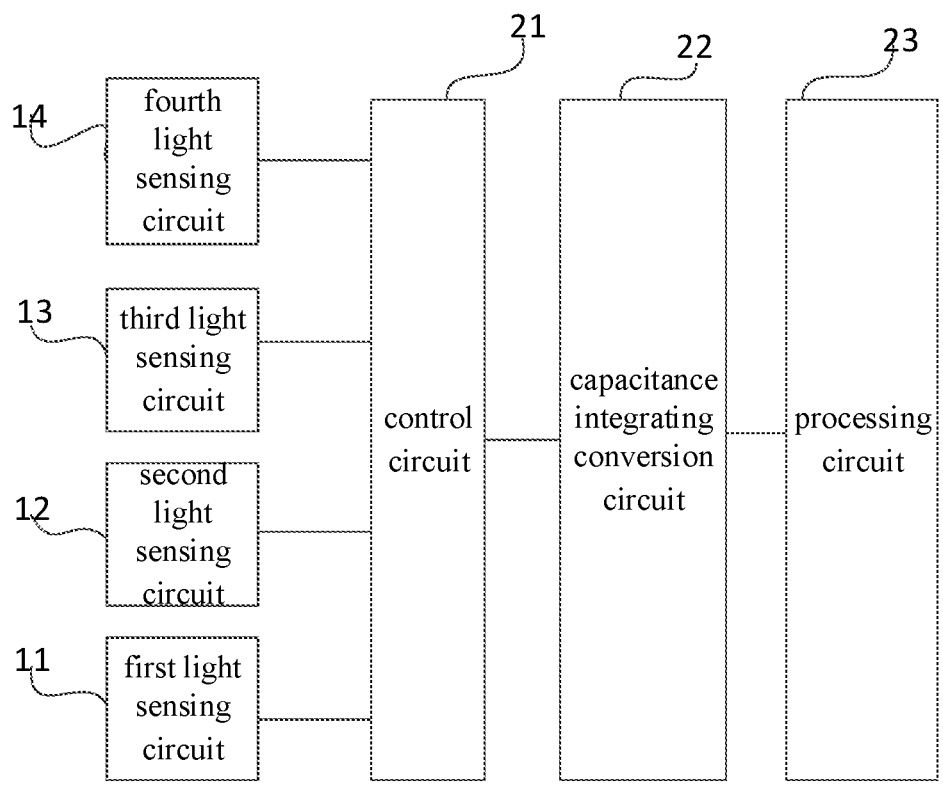
FIG. 1 is a structural diagram of a light detection module according to an embodiment of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative work shall fall within the protection scope of the present disclosure.

The transistors used in all the embodiments of the present disclosure may be triodes, thin film transistors, field effect transistors, or other devices with the same characteristics. In the embodiments of the present disclosure, in order to distinguish the two electrode of the transistor except the control electrode, one electrode is called the first electrode, and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

The light detection module described in the embodiments of the present disclosure includes N light sensing circuits, a control circuit, a capacitance integrating conversion circuit, and a processing circuit; N is a positive integer; the N light sensing circuits respectively sense light signals of different colors to generate a corresponding photocurrent;

The control circuit is used to control to provide photocurrents generated by the light sensing circuits to a capacitance integrating amplifying circuit in a time division manner, and to control a conversion parameter of the capacitance integrating amplifying circuit;

The capacitance integrating conversion circuit is configured to perform integrating conversion on the photocurrent according to the conversion parameter and an integration time, so as to obtain an analog output voltage;

The processing circuit is used to obtain characteristics of the light signal according to the analog output voltage.

The light detection module described in the embodiments of the present disclosure provides the photocurrent generated by each light sensing circuit to the capacitance integrating amplifying circuit in a time division manner through the control circuit, and controls the conversion parameter of the capacitance integrating amplifying circuit, and the capacitance integrating conversion circuit adopts the current integration method, the photocurrent is converted according to the conversion parameter and the integration time to obtain an analog output voltage, and the processing circuit obtains the characteristics of the light signal according to the analog output voltage.

The light detection module described in the embodiments of the present disclosure adopts the current-capacitance integrating principle through a capacitance integrating conversion circuit to convert the photocurrent into a sampled voltage (the sampled voltage is the analog output voltage), and the ratio between the absolute value of the variation of the voltage value of the analog output voltage and the absolute value of the variation of the photocurrent is the transfer coefficient of the capacitance integrating conversion circuit, and the transfer coefficient is related to the capacitance value of the integration capacitor and the integration time. With the increase of the integration time, the smaller photocurrent can also be accumulated to the sampling voltage that can be collected. Therefore, the requirements for the size of the photocurrent generated by the light sensing circuit can be reduced by increasing the integration time, that is, the number of photodiodes connected in parallel included in the light sensing circuit can be reduced, the space and cost can be saved.

In the embodiment of the present disclosure, the photocurrent of the photodiode is converted into a sampling voltage on which the analog-to-digital conversion can be performed by using the small capacitance integrating method, which can collect a smaller photocurrent, that is, the leakage current of tens of pA level, which reduces the number of photodiodes connected in parallel, thereby reducing the area occupied by the photodiode.

In at least one embodiment of the present disclosure, the integration time of the capacitance integrating amplifying circuit is also the time during which the integration conversion is performed on the photocurrent.

In at least one embodiment of the present disclosure, it is described that N is equal to 4, but in actual operation, N can be any positive integer, and the value of N can be selected according to the actual situation.

As shown in FIG. 1, the light detection module according to the embodiment of the present disclosure includes a first light sensing circuit 11, a second light sensing circuit 12, a third light sensing circuit 13, a fourth light sensing circuit 14, a control circuit 21, a capacitance integrating conversion circuit 22 and a processing circuit 23;

The first light sensing circuit 11 is configured to sense a red light signal to generate a first photocurrent;

The second light sensing circuit 12 is configured to sense a green light signal to generate a second photocurrent;

The third light sensing circuit 13 is configured to sense a blue light signal to generate a third photocurrent;

The fourth light sensing circuit 14 is configured to sense a white light signal to generate a fourth photocurrent;

The control circuit 21 is respectively connected to the first light sensing circuit 11, the second light sensing circuit 12, the third light sensing circuit 13, the fourth light sensing circuit 14 and the capacitance integrating conversion circuit 22, is configured to provide the first photocurrent, the second photocurrent, the third photocurrent, and the fourth photocurrent to the capacitance integrating amplifying circuit 22 in a time division manner, and to control the conversion parameter of the capacitance integrating amplifying circuit 22;

The capacitance integrating conversion circuit 22 is configured to convert the first photocurrent according to the conversion parameter and the integration time to obtain a corresponding first analog output voltage, convert the second photocurrent to obtain a corresponding second analog output voltage, convert the third photocurrent to obtain a corresponding third analog output voltage, and convert the fourth photocurrent to obtain a corresponding fourth analog output voltage;

The processing circuit 23 is electrically connected to the capacitance integrating conversion circuit 22, and is used to obtain the characteristics of the red light signal according to the first analog output voltage, obtain the characteristics of the green light signal according to the second analog output voltage, obtain the characteristic of the blue light signal according to the third analog output voltage, and obtain the characteristics of the white light signal according to the fourth analog output voltage.

In at least one embodiment of the present disclosure, the capacitance integrating conversion circuit includes a conversion sub-circuit, a sampling sub-circuit, and a sampling control sub-circuit; the control circuit includes a light sensing control sub-circuit and a capacitor control sub-circuit; the sampling sub-circuit includes M integrating capacitors; M is a positive integer;

The light sensing control sub-circuit is configured to control to provide the photocurrent generated by each light sensing circuit to the input end of the conversion sub-circuit in a time division manner under the control of the light sensing control signal;

The capacitor control sub-circuit is used to control to connect the first ends of the integrating capacitors to the input end of the conversion sub-circuit in a time division manner under the control of the capacitor control signal; the second ends of the integrating capacitors are electrically connected to the output end of the conversion sub-circuit;

The sampling control sub-circuit is used to control to connect or disconnect the output end of the conversion sub-circuit and the processing circuit under the control of the sampling control signal;

The conversion sub-circuit is configured to convert the photocurrent to obtain and output the analog output voltage through the output end of the conversion sub-circuit;

The conversion parameter is the capacitance value of the integrating capacitor currently in connection with the input end of the conversion sub-circuit.

In a specific implementation, the capacitance integrating conversion circuit may include a conversion sub-circuit, a sampling sub-circuit and a sampling control sub-circuit, the control circuit may include a light sensing control sub-circuit and a capacitor control sub-circuit, and the sampling sub-circuit may include M integrating capacitors; the light sensing control sub-circuit controls to provide the photocurrents generated by the light sensing circuits to the input end of the conversion sub-circuit in a time division manner, and the capacitor control sub-circuit controls the integrating capacitors to be connected to the input end of the conversion sub-circuit in a time division manner, the sampling control sub-circuit controls to connect or disconnect the output end of the conversion sub-circuit and the processing circuit, and the conversion sub-circuit converts the photocurrent into a corresponding analog output voltage.

In at least one embodiment of the present disclosure, it is described that M is equal to 5, but in actual operation, N can be a positive integer, and the value of M can be selected according to the actual situation.

Optionally, when the photocurrent generated by the light sensing circuit is as small as tens of pA, a small integrating capacitor (pF level) is required for integration. There are few small capacitors in the market and the accuracy is poor. Therefore, in the embodiment of the present disclosure, the small capacitors in pF level are fabricated on the display substrate using semiconductor technology. However, if a capacitor with a larger capacitance value is fabricated on the display substrate, a large fabrication area is required, so the embodiment of the present disclosure adopts a standard capacitor with a larger capacitance value, and integrates the standard capacitor with a larger capacitance value into the circuit board or driver IC.

In the specific implementation, the integrating capacitor with a small capacitance value can be arranged on the display substrate. Since the size of the electrode plate of the integrating capacitor with a larger capacitance value is larger, the integrating capacitor with a larger capacitance value can be arranged on the circuit board or driver IC.

Figure 2:
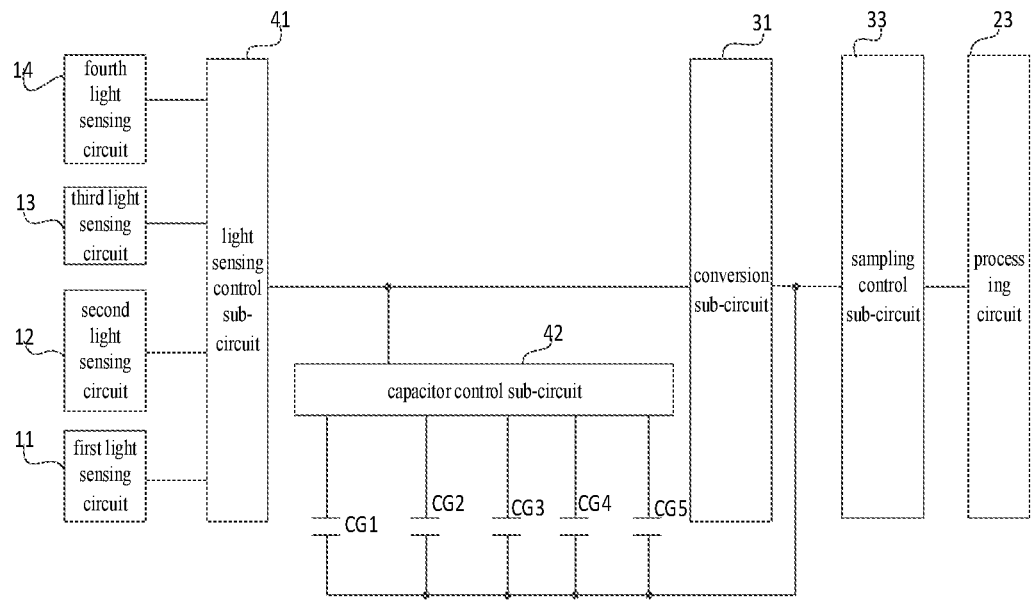
FIG. 2 is a structural diagram of a light detection module according to at least one embodiment of the present disclosure.

As shown in FIG. 2, on the basis of at least one embodiment of the light detection module shown in FIG. 1, the capacitance integrating conversion circuit includes a conversion sub-circuit 31, a sampling sub-circuit and a sampling control sub-circuit 33; the control circuit includes a light sensing control sub-circuit 41 and a capacitor control sub-circuit 42; the sampling sub-circuit includes a first integrating capacitor CG1, a second integrating capacitor CG2, a third integrating capacitor CG3, a fourth integrating capacitor CG4 and a fifth integrating capacitor CG5;

The light sensing control sub-circuit 41 is respectively electrically connected to the first light sensing circuit 11, the second light sensing circuit 12, the third light sensing circuit 13, the fourth light sensing circuit 14 and the input end of the conversion sub-circuit 31, is configured to control to provide the first photocurrent generated by the first light sensing circuit 11, the second photocurrent generated by the second light sensing sub-circuit 12, the third photocurrent generated by the third light sensing circuit 13 and the fourth photocurrent generated by the fourth light sensing circuit 14 to the input end of the conversion sub-circuit 31 in a time division manner under the control of the light sensing control signal;

The capacitor control sub-circuit 42 is respectively electrically connected to the first end of the first integrating capacitor CG1, the first end of the second integrating capacitor CG2, the first end of the third integrating capacitor CG3, the first end of the fourth integrating capacitor CG4, the first end of the fifth integrating capacitor CG5 and the input end of the conversion sub-circuit 31, and is configured to control to connect the first end of the first integrating capacitor CG1, the first end of the second integrating capacitor CG2, the first end of the third integrating capacitor CG3, the first end of the fourth integrating capacitor CG4 to the input end of the conversion sub-circuit 31 in a time division manner under the control of the capacitor control signal; control to connect the second end of the first integrating capacitor CG1, the second end of the second integrating capacitor CG2, the second end of the third integrating capacitor CG3, the second end of the fourth integrating capacitor CG4 and the second end of the fifth integrating capacitor CG5 to the output end of the conversion sub-circuit 31 respectively;

The sampling control sub-circuit 33 is electrically connected to the output end of the conversion sub-circuit 31 and the processing circuit 23 respectively, and is used to control to connect or disconnect the output end of the conversion sub-circuit 31 and the processing circuit 23 under the control of the sampling control signal;

The conversion sub-circuit 31 is configured to convert each of the photocurrents to obtain and output the analog output voltage through the output end of the conversion sub-circuit 31;

The conversion parameter is the capacitance value of the integrating capacitor currently connected to the input end of the conversion sub-circuit 31.

When the light detection module of at least one embodiment of the present disclosure as shown in FIG. 2 is in operation, the light sensing control sub-circuit 41 controls to provide the photocurrent to the input end of the conversion sub-circuit 31, and the capacitor control sub-circuit 42 controls the integrating capacitor connected to the input end of the conversion sub-circuit 31, and the sampling control sub-circuit 33 controls whether the output end of the conversion sub-circuit 31 is connected to the processing circuit 23, the conversion sub-circuit converts each photocurrent to obtain an analog output voltage.

The light detection module described in at least one embodiment of the present disclosure may further include a reset circuit; the reset circuit includes M reset sub-circuits;

An mth reset sub-circuit is respectively electrically connected to a first end of an mth integrating capacitor, a second end of the mth integrating capacitor and the reset control end, and is configured to control to connect the first end of the mth integrating capacitor and the second end of the mth integrating capacitor under the control of the reset control signal provided by the reset control end, so as to release the charge stored in the mth integrating capacitor;

m is a positive integer less than or equal to M.

In a specific implementation, the light detection module may further include a reset circuit, the reset circuit includes M reset sub-circuits, and the m-th reset sub-circuit controls the first end of the m-th integrating capacitor to be connected to the second end of the m-th integration capacitor before integration, so as to release the charge stored in the m-th integrating capacitor, so as not to affect the sampling result.

Figure 3:
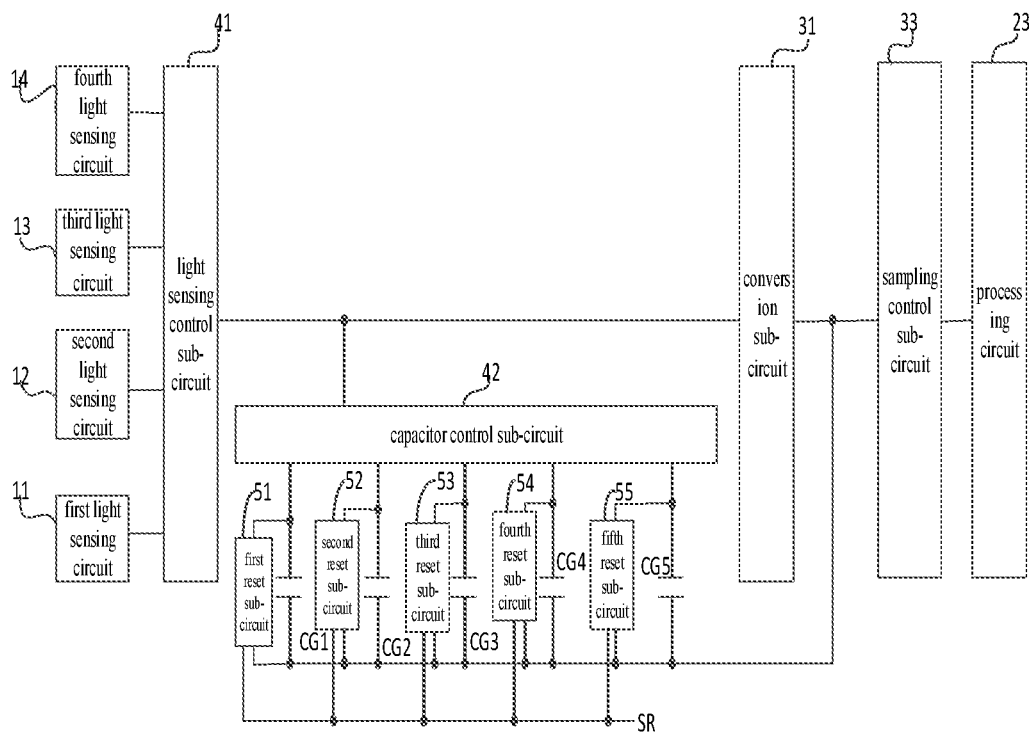
FIG. 3 is a structural diagram of a light detection module according to at least one embodiment of the present disclosure.

As shown in FIG. 3, on the basis of at least one embodiment of the light detection module shown in FIG. 2, the light detection module according to at least one embodiment of the present disclosure may further include a reset circuit; the reset circuit includes a first reset sub-circuit 51, a second reset sub-circuit 52, a third reset sub-circuit 53, a fourth reset sub-circuit 54 and a fifth reset sub-circuit 55;

The first reset sub-circuit 51 is respectively electrically connected to the first end of the first integrating capacitor CG1, the second end of the first integrating capacitor CG1 and the reset control end SR, and is used to connect the first end of the first integrating capacitor CG1 and the second end of the first integrating capacitor CG1 under the control of the reset control signal provided by the reset control end SR, so as to release the charge stored in the first integrating capacitor CG1;

The second reset sub-circuit 52 is respectively electrically connected to the first end of the second integrating capacitor CG2, the second end of the second integrating capacitor CG2 and the reset control end SR, and is used to connect the first end of the second integrating capacitor CG2 and the second end of the second integrating capacitor CG2 under the control of the reset control signal provided by the reset control end SR, so as to release the charge stored in the second integrating capacitor CG2;

The third reset sub-circuit 53 is respectively electrically connected to the first end of the third integrating capacitor CG3, the second end of the third integrating capacitor CG3 and the reset control end SR, and is used to connect the first end of the third integrating capacitor CG3 and the second end of the third integrating capacitor CG3 under the control of the reset control signal provided by the reset control end SR, so as to release the charge stored in the third integrating capacitor CG3;

The fourth reset sub-circuit 54 is respectively electrically connected to the first end of the fourth integrating capacitor CG4, the second end of the fourth integrating capacitor CG4 and the reset control end SR, and is used to connect the first end of the fourth integrating capacitor CG4 and the second end of the fourth integrating capacitor CG4 under the control of the reset control signal provided by the reset control end SR, so as to release the charge stored in the fourth integrating capacitor CG4;

The fifth reset sub-circuit 55 is respectively electrically connected to the first end of the fifth integrating capacitor CG5, the second end of the fifth integrating capacitor CG5 and the reset control end SR, and is used to connect the first end of the fifth integrating capacitor CG5 and the second end of the fifth integrating capacitor CG5 under the control of the reset control signal provided by the reset control end SR, so as to release the charge stored in the fifth integrating capacitor CG5.

When the light detection module shown in FIG. 3 of at least one embodiment of the present disclosure is in operation, The first reset sub-circuit 51 controls to connect the first end of the first integrating capacitor CG1 and the second end of the first integrating capacitor CG1 before the first end of the first integrating capacitor CG1 and the input end of the conversion sub-circuit 31 are changed from being connected to each other to being disconnected to each other, to release the charge stored in the first integrating capacitor CG1, so as not to affect the sampling result;

The first reset sub-circuit 52 controls to connect the first end of the second integrating capacitor CG2 and the second end of the second integrating capacitor CG2 before the first end of the second integrating capacitor CG2 and the input end of the conversion sub-circuit 31 are changed from being connected to each other to being disconnected to each other, to release the charge stored in the second integrating capacitor CG2, so as not to affect the sampling result;

The third reset sub-circuit 53 controls to connect the first end of the third integrating capacitor CG3 and the second end of the third integrating capacitor CG3 before the first end of the third integrating capacitor CG3 and the input end of the conversion sub-circuit 31 are changed from being connected to each other to being disconnected to each other, to release the charge stored in the third integrating capacitor CG3, so as not to affect the sampling result;

The fourth reset sub-circuit 54 controls to connect the first end of the fourth integrating capacitor CG4 and the second end of the fourth integrating capacitor CG4 before the first end of the fourth integrating capacitor CG4 and the input end of the conversion sub-circuit 31 are changed from being connected to each other to being disconnected to each other, to release the charge stored in the fourth integrating capacitor CG4, so as not to affect the sampling result;

The fifth reset sub-circuit 55 controls to connect the first end of the fifth integrating capacitor CG5 and the second end of the fifth integrating capacitor CG5 before the first end of the fifth integrating capacitor CG5 and the input end of the conversion sub-circuit 31 are changed from being connected to each other to being disconnected to each other, to release the charge stored in the fifth integrating capacitor CG5, so as not to affect the sampling result;

Optionally, the light sensing control sub-circuit includes N light sensing control transistors; the capacitor control sub-circuit includes M capacitor control transistors; n is a positive integer less than or equal to N, and m is a positive integer less than or equal to M; the sampling control sub-circuit includes a sampling switch and a storage capacitor;

A control electrode of the nth light sensing control transistor is electrically connected to the nth light sensing control end, a first electrode of the nth light sensing control transistor is electrically connected to the nth photocurrent output end, and a second electrode of the nth light sensing control transistor is electrically connected to the input end of the conversion sub-circuit; the nth light sensing control end is used to provide the nth light sensing control signal;

A control electrode of the mth capacitor control transistor is electrically connected to the mth capacitor control end, a first electrode of the mth capacitor control transistor is electrically connected to the input end of the conversion sub-circuit, and a second electrode of the mth capacitor control transistor is electrically connected to the mth capacitor control transistor. The first end of the integrating capacitor is electrically connected to the output end of the conversion sub-circuit; the mth capacitor control end is used to provide the mth capacitor control signal;

A control end of the sampling switch is electrically connected to the sampling control end, a first end of the sampling switch is electrically connected to the output end of the conversion sub-circuit, and a second end of the sampling switch is electrically connected to the processing circuit;

A first end of the storage capacitor is electrically connected to the second end of the sampling switch, and a second end of the storage capacitor is electrically connected to a DC voltage end.

Optionally, the DC voltage end may be a ground end, but not limited thereto.

The light detection module described in at least one embodiment of the present disclosure may further include a filter circuit;

The filter circuit is connected between the output end of the conversion sub-circuit and the first end of the sampling switch, and is used to filter out the high-frequency noise in the analog output voltage, and provide an analog output voltage after filtering out the high-frequency noise to the first end of the sampling switch.

In at least one embodiment of the present disclosure, the filter circuit may be a low-pass filter circuit, which can effectively filter out high-frequency noise in the analog output voltage, so that the output signal is stable and the noise fluctuation is reduced.

Figure 4:
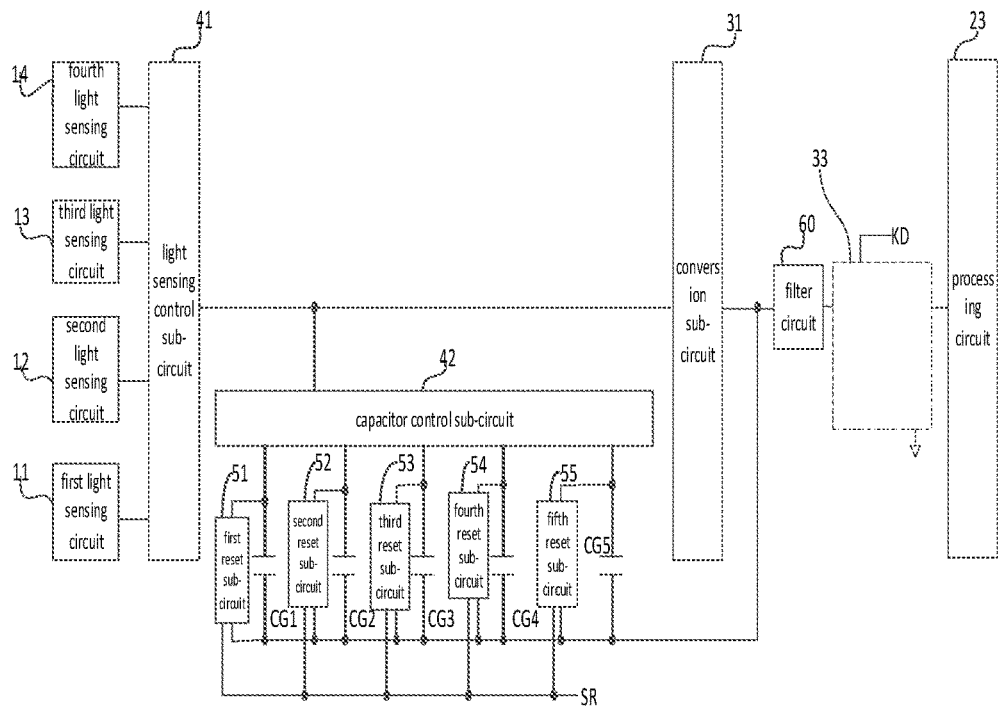
FIG. 4 is a structural diagram of a light detection module according to at least one embodiment of the present disclosure.

As shown in FIG. 4, on the basis of the light detection module shown in FIG. 3, the sampling control sub-circuit 33 includes a sampling switch S0 and a storage capacitor C0; the light detection module described in at least one embodiment of the present disclosure also includes a filter circuit 60;

The control end of the sampling switch S0 is electrically connected to the sampling control end KD, the first end of the sampling switch S0 is electrically connected to the output end of the conversion sub-circuit 31 through the filter circuit 60, and the second end of the sampling switch S0 is electrically connected to the processing circuit 23;

The first end of the storage capacitor C0 is electrically connected to the second end of the sampling switch S0, and the second end of the storage capacitor C0 is electrically connected to the ground end;

The filter circuit 60 is connected between the output end of the conversion sub-circuit 31 and the first end of the sampling switch S0, and is used to filter out the high-frequency noise in the analog output voltage, and provide the analog output voltage after filtering out the high-frequency noise to the first end of the sampling switch S0.

Optionally, the mth reset sub-circuit includes an mth reset transistor;

A control electrode of the mth reset transistor is electrically connected to the reset control end, a first electrode of the mth reset transistor is electrically connected to the first end of the mth integration capacitor, and a second electrode of the mth reset transistor is electrically connected to the second end of the mth integrating capacitor.

In at least one embodiment of the present disclosure, the N light sensing circuits, the light sensing control sub-circuit, the capacitor control sub-circuit, and the reset circuit may all be arranged on the display substrate.

Optionally, the conversion sub-circuit includes an operational amplifier; an inverting input end of the operational amplifier is the input end of the conversion sub-circuit, and an output end of the operational amplifier is the output end of the conversion sub-circuit;

A non-inverting input end of the operational amplifier is electrically connected to a reference voltage end, and the reference voltage end is used to provide a reference voltage.

In a specific implementation, the voltage value of the reference voltage may be 1.5V or 2V, but not limited thereto, and the voltage value of the reference voltage may be determined according to the input voltage of the digital-to-analog converter.

The light detection module described in at least one embodiment of the present disclosure may further include a control signal generating unit;

The control signal generating unit is used to provide a sampling control signal, a light sensing control signal, a capacitor control signal and a reset control signal.

Optionally, the control signal generating unit may include a control signal generating circuit and a level converter;

The control signal generating circuit is used to provide a sampling control signal, an input light sensing control signal, an input capacitor control signal and an input reset control signal;

The level converter is electrically connected to the control signal generating circuit, and is used to perform level conversion on the input light sensing control signal to generate the light sensing control signal and perform level conversion on the input capacitor control signal to generate the capacitor control signal, and perform level conversion on the input reset control signal to generate the reset control signal.

Optionally, the processing circuit includes an analog-to-digital converter and an output processing unit;

the analog-to-digital converter is used to convert the analog output voltage into an output digital signal;

The output processing unit is electrically connected to the analog-to-digital converter, and is used to receive the output digital signal, obtain the characteristics of the light signal according to the output digital signal, and transmit the characteristic information of the light signal to an application unit, so that the application unit can obtain current ambient light data according to the light signal.

In at least one embodiment of the present disclosure, the characteristics of the light signal may include at least one of light intensity, brightness, color coordinates, or color temperature, but are not limited thereto.

In specific implementation, the output processing unit may be an algorithm unit, which processes the output digital signal, determines the validity of the output digital signal, and converts the output digital signal into a digital signal corresponding to light intensity and brightness. At the same time, optical characteristic parameters such as color coordinates or color temperature are calculated according to the output digital signals corresponding to different colors, to meet the use of the application unit.

Figure 5:
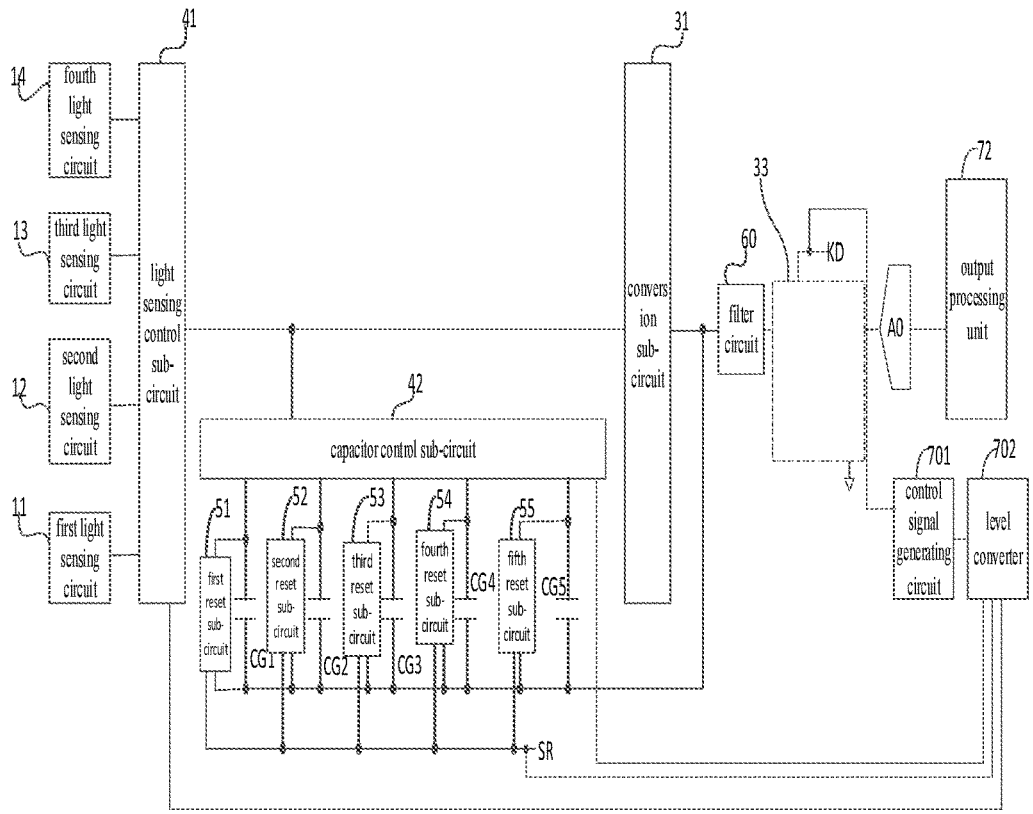
FIG. 5 is a structural diagram of a light detection module according to at least one embodiment of the present disclosure.

As shown in FIG. 5, on the basis of at least one embodiment of the light detection module shown in FIG. 4, the light detection module according to at least one embodiment of the present disclosure may further include a control signal generating unit; the processing circuit includes an analog-to-digital converter A0 and an output processing unit 72; the control signal generating unit includes a control signal generating circuit 701 and a level converter 702;

The control signal generation circuit 701 is electrically connected to the sampling control end KD and the level converter 702 respectively, and is used to provide a sampling control signal for the sampling control end KD, and to provide a sampling control signal for the level converter 702, provide an input light sensing control signal, an input capacitor control signal and an input reset control signal to the level converter 702;

The level converter 702 is respectively electrically connected to the reset control end SR, the light sensing control sub-circuit 41, the capacitor control sub-circuit 42 and the reset control end SR, and is used to perform level conversion on the input light sensing control signal to generate the light sensing control signal, perform level conversion on the input capacitor control signal to generate the capacitor control signal, perform level conversion on the input reset control signal to generate the reset control signal, and provide the light sensing control signal to the light sensing control sub-circuit 41, provide the capacitor control signal to the capacitor control sub-circuit 42, and provide the reset control signal to the reset control end SR;

The analog-to-digital converter A0 is electrically connected to the second end of the sampling switch S0, is configured to convert the analog output voltage into an output digital signal;

The output processing unit 72 is electrically connected to the analog-to-digital converter A0, and is configured to receive the output digital signal, and obtain the characteristics of the light signal according to the output digital signal.

In at least one embodiment of the present disclosure, when each light sensing control transistor, each capacitor control transistor, and each reset transistor are n-type transistors, the potential of each light sensing control signal, the potential of each capacitor control signal, and the potential of each reset control signal is 7V, each light sensing control transistor, each capacitor control transistor, and each reset transistor are turned on. When each light sensing control transistor, each capacitor control transistor, and each reset transistor are p-type transistors, when the potential of each light sensing control signal, each capacitor control signal and each reset control signal is −7V, each light sensing control transistor, each capacitor control transistor, and each reset transistor are turned on. The low voltage value and the high voltage value of each control signal provided by the control signal generating circuit 701 are 0V and 3V respectively. At this time, the level converter 70 is required to convert the 0V voltage into −7V voltage and convert the 3.3V voltage into 7V voltage, so as to satisfy the requirements of control level of each light sensing control transistor, the control level of each capacitor control transistor, and the control level of each reset transistor.

The light detection module according to at least one embodiment of the present disclosure may further include a micro-control unit; the control signal generating circuit and the output processing unit are both arranged in the micro-control unit.

Optionally, the light detection module may further include a filter circuit;

The micro-control unit, the level converter, the analog-to-digital converter, the filter circuit, and the conversion sub-circuit and the sampling control sub-circuit included in the capacitance integrating conversion circuit may all be arranged on the circuit board or on the driver integrated circuit.

Optionally, the nth light sensing circuit includes an nth photodiode; n is a positive integer less than or equal to N;

The cathode of the nth photodiode is electrically connected to the power supply voltage end, and the anode of the nth photodiode is used to provide the nth photocurrent;

The power supply voltage end is used to provide a power supply voltage signal.

Figure 6:
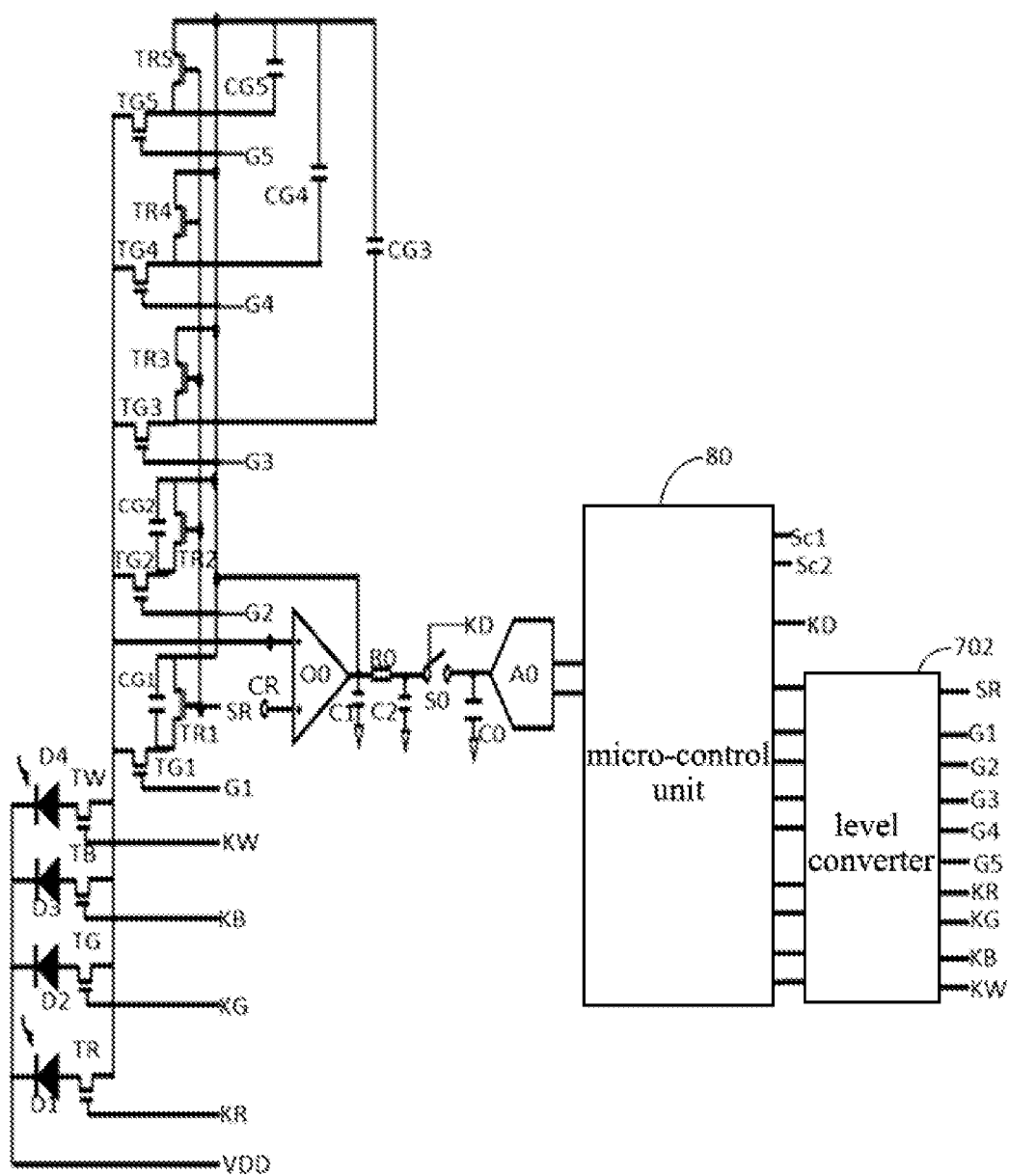
FIG. 6 is a circuit diagram of a light detection module according to at least one embodiment of the present disclosure.

As shown in FIG. 6, on the basis of the light detection module shown in FIG. 4, the light detection module described in at least one embodiment of the present disclosure may further include a control signal generating unit and a micro-control unit 80; the processing circuit includes an analog-to-digital converter A0 and an output processing unit;

The control signal generating unit includes a control signal generating circuit and a level converter 702;

The control signal generating circuit and the output processing unit are integrated in the micro-control unit 80;

The first light sensing circuit includes a first photodiode D1; the cathode of the first photodiode D1 is electrically connected to the power supply voltage end VDD, and the first photodiode D1 is used to sense a red light signal to generate a corresponding first photocurrent;

The second light sensing circuit includes a second photodiode D2; the cathode of the second photodiode D2 is electrically connected to the power supply voltage end VDD, and the second photodiode D2 is used to sense a green light signal to generate a corresponding second photocurrent;

The third light sensing circuit includes a third photodiode D3; the cathode of the third photodiode D3 is electrically connected to the power supply voltage end VDD, and the third photodiode D3 is used to sense a blue light signal to generate a corresponding third photocurrent;

The fourth light sensing circuit includes a fourth photodiode D4; the cathode of the fourth photodiode D4 is electrically connected to the power supply voltage end VDD, and the fourth photodiode D4 is used to sense a white light signal to generate a corresponding fourth photocurrent;

The light sensing control sub-circuit includes a first light sensing control transistor TR, a second light sensing control transistor TG, a third light sensing control transistor TB and a fourth light sensing control transistor TW; the capacitor control sub-circuit includes a first capacitor control transistor TG1, a second capacitor control transistor TG2, a third capacitor control transistor TG3, a fourth capacitor control transistor TG4 and a fifth capacitor control transistor TG5; the conversion sub-circuit 31 includes an operational amplifier O0;

The gate electrode of the first light sensing control transistor TR is electrically connected to the first light sensing control end KR, the source electrode of the first light sensing control transistor TR is electrically connected to the first photocurrent output end, and the drain electrode of the first light sensing control transistor TR is electrically connected to the inverting input end of the operational amplifier O0, and the first photocurrent output end is electrically connected to the anode of the first photodiode D1;

The gate electrode of the second light sensing control transistor TG is electrically connected to the second light sensing control end KG, the source electrode of the second light sensing control transistor TG is electrically connected to the second photocurrent output end, and the drain electrode of the second light sensing control transistor TG is electrically connected to the inverting input end of the operational amplifier O0, and the second photocurrent output end is electrically connected to the anode of the second photodiode D2;

The gate electrode of the third light sensing control transistor TB is electrically connected to the third light sensing control end KB, the source electrode of the third light sensing control transistor TB is electrically connected to the third photocurrent output end, and the drain electrode of the third light sensing control transistor TB is electrically connected to the inverting input end of the operational amplifier O0, and the third photocurrent output end is electrically connected to the anode of the third photodiode D3;

The gate electrode of the fourth light sensing control transistor TW is electrically connected to the fourth light sensing control end KW, the source electrode of the fourth light sensing control transistor TW is electrically connected to the fourth light current output end, and the drain electrode of the fourth light sensing control transistor TW is electrically connected to the inverting input end of the operational amplifier O0, and the fourth photocurrent output end is electrically connected to the anode of the fourth photodiode D4;

The gate electrode of the first capacitor control transistor TG1 is electrically connected to the first capacitor control end G1, the source electrode of the first capacitor control transistor TG1 is electrically connected to the inverting input end of the operational amplifier O0, and the drain electrode of the first capacitor control transistor TG1 is electrically connected to the first end of the first integrating capacitor CG1;

The gate electrode of the second capacitor control transistor TG2 is electrically connected to the second capacitor control end G2, the source electrode of the second capacitor control transistor TG2 is electrically connected to the inverting input end of the operational amplifier O0, and the drain electrode of the second capacitor control transistor TG2 is electrically connected to the first end of the second integrating capacitor CG2;

The gate electrode of the third capacitor control transistor TG3 is electrically connected to the third capacitor control end G3, the source electrode of the third capacitor control transistor TG3 is electrically connected to the inverting input end of the operational amplifier O0, and the drain electrode of the third capacitor control transistor TG3 is electrically connected to the first end of the third integrating capacitor CG3;

The gate electrode of the fourth capacitor control transistor TG4 is electrically connected to the fourth capacitor control end G4, the source electrode of the fourth capacitor control transistor TG4 is electrically connected to the inverting input end of the operational amplifier O0, and the drain electrode of the fourth capacitor control transistor TG4 is electrically connected to the first end of the fourth integrating capacitor CG4;

The second end of the first integration capacitor CG1, the second end of the second integration capacitor CG2, the second end of the third integration capacitor CG3, the second end of the fourth integration capacitor CG4 and the second end of the fifth integrating capacitor CG5 are all electrically connected to the output end O1 of the operational amplifier O0;

The first reset sub-circuit includes a first reset transistor TR1, the second reset sub-circuit includes a second reset transistor TR2, the third reset sub-circuit includes a third reset transistor TR3, the fourth reset sub-circuit includes a fourth reset transistor TR4, and the fifth reset sub-circuit includes a fifth reset transistor TR5;

The gate electrode of the first reset transistor TR1 is electrically connected to the reset control end SR, the source electrode of the first reset transistor TR1 is electrically connected to the first end of the first integrating capacitor CG1, and the drain electrode of the first reset transistor TR1 is electrically connected to the second end of the first integrating capacitor CG1;

The gate electrode of the second reset transistor TR2 is electrically connected to the reset control end SR, the source electrode of the second reset transistor TR2 is electrically connected to the first end of the second integrating capacitor CG2, and the drain electrode of the second reset transistor TR2 is electrically connected to the second end of the second integrating capacitor CG2;

The gate electrode of the third reset transistor TR3 is electrically connected to the reset control end SR, the source electrode of the third reset transistor TR3 is electrically connected to the first end of the third integrating capacitor CG3, and the drain electrode of the third reset transistor TR3 is electrically connected to the second end of the third integrating capacitor CG3;

The gate electrode of the fourth reset transistor TR4 is electrically connected to the reset control end SR, the source electrode of the fourth reset transistor TR4 is electrically connected to the first end of the fourth integrating capacitor CG4, and the drain electrode of the fourth reset transistor TR4 is electrically connected to the second end of the fourth integrating capacitor CG4;

The gate electrode of the fifth reset transistor TR5 is electrically connected to the reset control end SR, the source electrode of the fifth reset transistor TR5 is electrically connected to the first end of the fifth integrating capacitor CG5, and the drain electrode of the fifth reset transistor TR5 is electrically connected to the second end of the fifth integrating capacitor CG5;

The non-inverting input end of the operational amplifier O0 is electrically connected to the reference voltage end CR, the reference voltage end CR is used to provide the reference voltage Vref, and the voltage value of the reference voltage Vref is 2.0V;

The filter circuit includes a first filter capacitor C1, a filter resistor R0 and a second filter capacitor C2;

The first end of the first filter capacitor C1 is electrically connected to the output end of the operational amplifier O0, and the second end of the first filter capacitor C1 is grounded;

The first end of the filter resistor R0 is electrically connected to the output end of the operational amplifier O0, and the second end of the filter resistor R0 is electrically connected to the first end of the sampling switch S0;

The first end of the second filter capacitor C2 is electrically connected to the second end of the filter resistor R0, and the second end of the second filter capacitor C2 is grounded;

The control end of the sampling switch S0 is electrically connected to the sampling control end KD, the second end of the sampling switch S0 is electrically connected to the first end of the storage capacitor C0, and the second end of the storage capacitor C0 is grounded;

The second end of the sampling switch S0 is electrically connected to the input end of the analog-to-digital converter A0, and the output end of the analog-to-digital converter A0 is electrically connected to the micro-control unit 80;

The analog-to-digital converter A0 is used to perform analog-to-digital conversion on the analog output voltage received by the input end thereof, to obtain a corresponding output digital signal;

The output processing unit arranged in the micro-control unit 80 is used to obtain the characteristics of the corresponding light signal according to the output digital signal;

The control signal generation circuit arranged in the micro-control unit 80 is electrically connected to the sampling control end KD, and is used to provide the sampling control signal for the sampling control end KD; the control signal generating circuit is also connected to the level converter 702 to provide the level converter 702 with an input reset control signal, a first input light sensing control signal, a second input light sensing control signal, a third input light sensing control signal, a fourth input light sensor control signal, a first input capacitor control signal, a second input capacitor control signal, a third input capacitor control signal, a fourth input capacitor control signal and a fifth input capacitor control signal;

The level converter 702 is respectively connected to the reset control end SR, the first light sensing control end KR, the second light sensing control end KG, the third light sensing control end KB, the fourth light sensing control end KW, the first capacitor control end G1, the second capacitor control end G2, the third capacitor control end G3, the fourth capacitor control end G4 and the fifth capacitor control end G5, to perform level conversion on the input reset control signal to obtain reset control signal, and provide the reset control signal to the reset control end SR, and perform level conversion on the first input light sensing control signal to obtain a first light sensing control signal, and provide the first light sensing control signal to the first light sensing control end KR, perform level conversion on the second input light sensing control signal to obtain a second light sensing control signal, and provide the second light sensing control signal to the second light sensing control end KG, perform level conversion on the third input light sensing control signal to obtain a third light sensing control signal, and provide the third light sensing control signal to the third light sensing control end KB, perform level conversion on the fourth input light sensing control signal to obtain a fourth light sensing control signal, and provide the fourth light sensing control signal to the fourth light sensing control end KW, perform level conversion on the first input capacitor control signal to obtain a first capacitor control signal, and provide the first capacitor control signal to the first capacitor control end G1, perform level conversion on the second input capacitor control signal to obtain a second capacitor control signal, and provide the second capacitor control signal to the second capacitor control end G2, perform level conversion on the third input capacitor control signal to obtain a third capacitor control signal, and provide the third capacitor control signal to the third capacitor control end G3, perform level conversion on the fourth input capacitor control signal to obtain a fourth capacitor control signal, and provide the fourth capacitor control signal to the fourth capacitor control end G4, perform level conversion on the fifth input capacitor control signal to obtain a fifth capacitor control signal, and provide the fifth capacitor control signal to the fifth capacitor control end G5, The micro-control unit 80 may further include a first serial output interface Sc1 and a second serial output interface Sc2, and can output the characteristics of the light signal to the application unit through the first serial output interface Sc1 and the second serial output interface Sc2, so that the application unit can obtain the data of the current ambient light signal according to the light signal.

In the light detection module shown in FIG. 6, the first serial output interface Sc1 may be a serial peripheral interface (SPI interface) or a bidirectional binary synchronous serial bus (I2C) interface, the second serial output interface may be an SPI interface or an I2C interface, but not limited thereto.

In the light detection module shown in FIG. 6, the filter circuit includes one filter resistor and two filter capacitors, but the structure of each filter circuit is not limited to the above structure, as long as the filter circuit can achieve the purpose of filtering out high-frequency noise, and the specific structure of the filtering circuit can be selected according to the actual situation;

The filter circuit is a low-pass filter circuit, which can effectively filter out high-frequency noise, so that the output signal is stable and the noise fluctuation is reduced.

In the light detection module shown in FIG. 6, each light sensing control transistor, each sampling control transistor, and each reset transistor may all be n-type transistors, but not limited thereto. In actual operation, the above transistors can also be replaced by p-type transistors.

In the light detection module shown in FIG. 6, each photodiode, each light sensing control transistor, each capacitor control transistor and each reset transistor can be arranged on the display substrate, and the thin film transistors may be fabricated on the display substrate at the same time as the transistors, each light sensing control transistor, each capacitor control transistor and each reset transistor; the operational amplifier, the filter circuit, the sampling switch, the storage capacitor, the analog-to-digital converter, the micro-control unit and the level converter can be arranged on the circuit board or display driver integrated circuit.

In the light detection module shown in FIG. 6, when each light sensing control transistor, each capacitor control transistor and each reset transistor are fabricated by a thin film transistor (TFT) process, including low temperature poly-silicon (LTPS) P type metal-oxide-semiconductor transistor (PMOS), LTPS N-type metal-oxide-semiconductor transistor (NMOS) and indium gallium zinc oxide (IGZO) and other processes, when each light sensing control transistor, each capacitor control transistor and each reset transistor are n-type transistors, when the potential of each light sensing control signal is 7V, each light sensing control transistor is turned on, and when the potential of each capacitor control signal is 7V, each capacitor control transistor is turned on, when the potential of each reset control signal is 7V, each reset transistor is turned on; when each light sensing control transistor, each capacitor control transistor and each reset transistor are p-type transistors, when the potential of each light sensing control signal is −7V, each light sensing control transistor is turned on, when the potential of each capacitor control signal is −7V, each capacitor control transistor is turned on, and when the potential of each reset control signal is −7V, each reset transistor is turned on; the low voltage value and high voltage value of each control signal provided by the control unit 80 are 0V and 3V, respectively. At this time, the level converter 70 is required to convert the 0V voltage into a −7V voltage, and convert the 3.3V voltage into a 7V voltage, so as to meet the requirements of the control level of each control transistor.

In the light detection module shown in FIG. 6, the capacitance value of the first integrating capacitor CG1, the capacitance value of the second integrating capacitor CG2, the capacitance value of the third integrating capacitor CG3, and the capacitance value of the fourth integrating capacitor CG4 and the capacitance value of the fifth integrating capacitor CG5 are different from each other.

During specific implementation, the capacitance value of each integrating capacitor can be flexibly selected according to the current value range and integration time of the photocurrent generated by each photodiode.

In the light detection module shown in FIG. 6, the capacitance value of the first integrating capacitor CG1 may be 0.1 pF, the capacitance value of the second integrating capacitor CG2 may be 1 pF, and the capacitance value of the third integrating capacitor CG3 can be 10 pF, the capacitance value of the fourth integrating capacitor CG4 can be 100 pF, and the capacitance value of the fifth integrating capacitor CG5 can be 1 nF, but not limited to this;

The capacitance value of the first integration capacitor CG1 and the capacitance value of the second integration capacitor CG2 are relatively small, and the first integration capacitor CG1 and the second integration capacitor CG2 may be arranged on the display substrate;

The capacitance value of the third integration capacitor CG3, the capacitance value of the fourth integration capacitor CG4, and the capacitance value of the fifth integration capacitor CG5 are larger, and the third integration capacitor CG3 and the fourth integration capacitor CG4 and the fifth integrating capacitor CG5 can be arranged on the flexible circuit board (FPC).

In at least one embodiment of the present disclosure, capacitance values of at least part of the integrating capacitors are less than 10 pF, and the at least part of the integrating capacitors may be disposed on a display substrate, and integrating capacitors other than the at least part of integrating capacitor included in the sampling sub-circuit can be arranged on the circuit board or the driving integrated circuit.

In the light detection module shown in FIG. 6, the input voltage range of the analog-to-digital converter A0 is greater than or equal to VS3 and less than or equal to VS4. If the analog-to-digital converter A0 is an n-bit analog-to-digital converter, the conversion accuracy of a least significant bit (LSB) can be obtained as $(VS4-VS3)/2^n$. For example, when n is equal to 16, the input voltage range of the 16 bit analog-to-digital converter is greater than or equal to 0V and less than or equal to 3.64V, the conversion accuracy of one LSB is 55.5 uV. However, when the input voltage range of the analog-to-digital converter A0 is greater than or equal to VS1 and less than or equal to VS2, there is a high-precision linear relationship for the converted digital signals, where $VS3<VS1<VS2<VS4$.

In order to ensure the accuracy of analog-to-digital conversion, the input voltage range of the analog-to-digital converter is greater than or equal to the first voltage VS1 and less than the second voltage VS2. In at least one embodiment of the present disclosure, VS1 may be 0.2V, VS2 may be 2.0V, VS3 can be 0V, VS4 can be 3.64V, that is, the input voltage range of the input analog-to-digital converter A0 is allowed to be greater than or equal to 0V and less than or equal to 3.64V, but when the input voltage range is greater than or equal to 0.2V and less than or equal to 2.0V, there is a high-precision linear relationship in the analog-to-digital conversion, and the accuracy is relatively high.

In at least one embodiment of the present disclosure, the high-precision voltage conversion range of the analog-to-digital converter A0 is the range of the input voltage that the analog-to-digital converter A0 can accurately perform analog-to-digital conversion; the voltage conversion range of the analog-to-digital converter A0 is the range of the input voltage that the analog-to-digital converter A0 can perform analog-to-digital conversion. For example, the high-precision voltage conversion range of the analog-to-digital converter A0 may be greater than or equal to the first voltage VS1 but less than or equal to VS2, and the voltage conversion range of the analog-to-digital converter A0 may be greater than or equal to VS3 and less than or equal to VS4. The input voltage is the voltage inputted to the analog-to-digital converter A0.

When the light detection module of the present disclosure as shown in FIG. 6 is in operation, after each reset transistor is reset, and in the case that each reset transistor is turned off, before S0 changes from the on state to the off state, the time during which the photocurrent continues to charge the corresponding integrating capacitor is the integration time.

Figure 7:
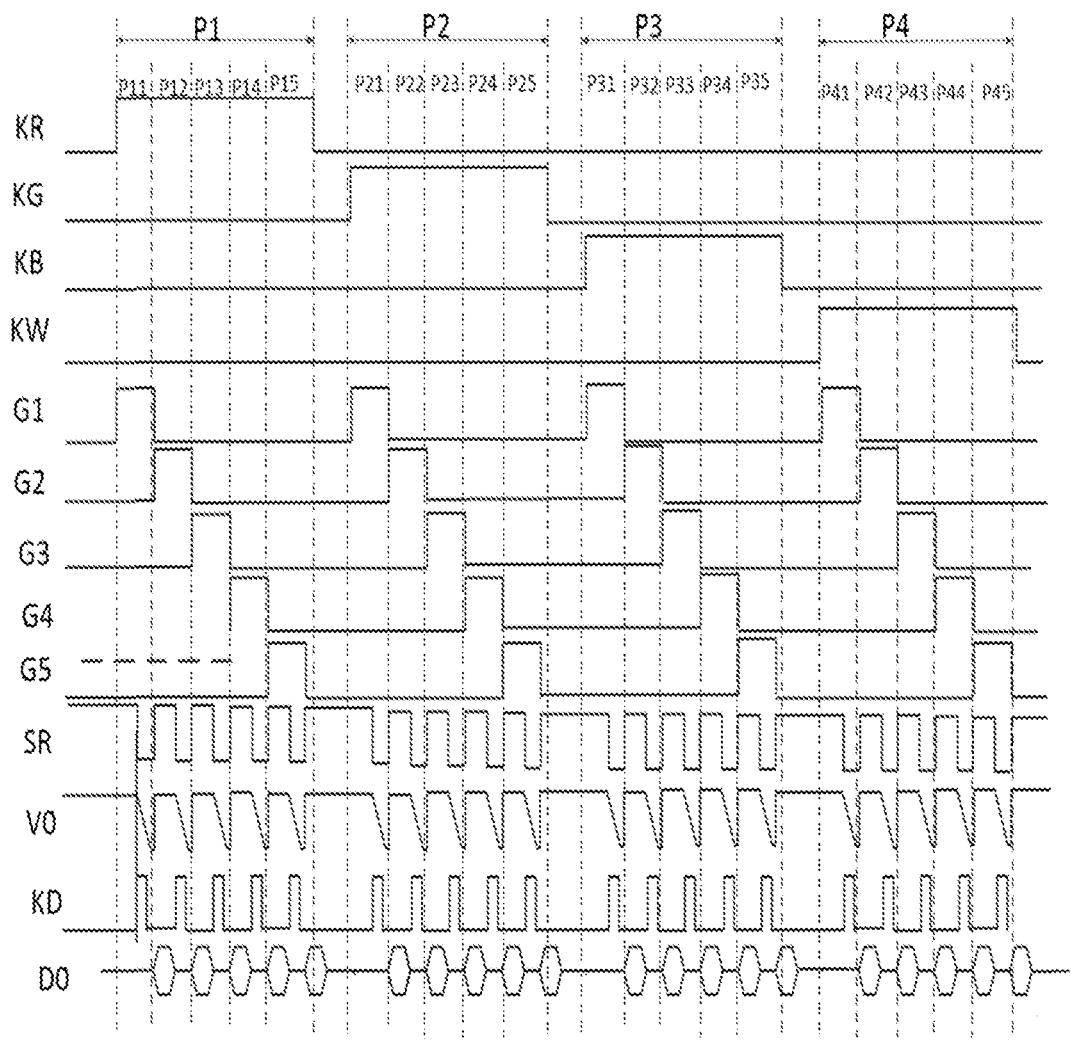
FIG. 7 is a timing diagram of the light detection module shown in FIG. 6 according to at least one embodiment of the present disclosure.

In FIG. 7, V0 is the potential of the output end of the operational amplifier O0, and D0 is the output digital signal outputted by the analog-to-digital converter A0.

As shown in FIG. 7, when the light detection module shown in FIG. 6 of at least one embodiment of the present disclosure is in operation, the detection time period includes a first sampling phase S1, a second sampling phase S2, a third sampling phase S3 and a fourth sampling phase S4 that are set in sequence;

The first sampling phase S1 includes a first sampling period S11, a second sampling period S12, a third sampling period S13, a fourth sampling period S14 and a fifth sampling period S15 that are set successively;

The second sampling phase S2 includes a sixth sampling period S21, a seventh sampling period S22, an eighth sampling period S23, a ninth sampling period S24 and a tenth sampling period S25 that are set successively;

The third sampling phase S3 includes an eleventh sampling period S31, a twelfth sampling period S32, a thirteenth sampling period S33, a fourteenth sampling period S34 and a fifteenth sampling period S35 that are set successively;

The fourth sampling phase S4 includes a sixteenth sampling period S41, a seventeenth sampling period S42, an eighteenth sampling period S43, a nineteenth sampling period S44 and a twentieth sampling period S45 that are set successively;

In the first sampling period S11, KR provides a high-level signal, KG, KB and KW all provide a low-level signal, G1 provides a high-level signal, G2, G3, G4 and G5 all provide a low-level signal, TR is turned on, TG, TB and TW are turned off, TG1 is turned on, TG2, TG3, TG4 and TG5 are all turned off; the first sampling period S1 includes a first reset period and a first integration period set successively;

In the first reset period, SR provides a high-level signal, KD provides a low-level signal, TR1 is turned on, and the first end of CG1 and the second end of CG1 are connected to release the charge in CG1 and complete the charge reset of the integration capacitor;

In the first integration period, the reset control signal provided by SR changes from a high-level signal to a low-level signal, KD provides a high-level signal, TR1 is turned off, and D1 converts the received red light signal into a first first photocurrent, the first first photocurrent is written into the first end of the first integrating capacitor CG1 through TR and TG1 that are turned on; the first first photocurrent flows to the first integrating capacitor CG1, a voltage drop is formed on CG1, that is, the first first photocurrent starts to accumulate on the first integrating capacitor CG1 to realize the integration function; S0 is turned on, and the integrated voltage is stored into the storage capacitor C0; Vo1 is equal to $Vref-(Ir1 \times t0/Cz1)$, where Vo1 is the potential of the output end of the operational amplifier O0 at the end of the integration, Ir1 is the current value of the first first photocurrent, t0 is the integration time, and Cz1 is the capacitance value of CG1; the integration time t0 is the time that S0 is continuously turned on in the first integration period. For example, the integration time t0 may be 100 us; at the end of the integration, the voltage value of the analog output voltage outputted by the operational amplifier O0 is Vo1, the analog output voltage is written into the input end of the analog-to-digital converter A0 after passing through the filter circuit, and the analog-to-digital converter A0 performs analog-to-digital conversion on the analog output voltage to obtain the corresponding output digital signal, and the output digital signal is written into the micro-control unit 80, and the output processing unit in the micro-control unit 80 obtains the characteristics of the corresponding red light signal according to the output digital signal;

In the second sampling period S12, the signal provided by KR remains at a high-level signal, KG, KB and KW all provide a low-level signal, G2 provides a high-level signal, and G1, G3, G4 and G5 all provide a low-level signal, TR is turned on, TG, TB and TW are turned off, TG2 is turned on, and TG1, TG3, TG4 and TG5 are all turned off; the second sampling period S12 includes a second reset period and a second integration period set successively;

In the second reset period, SR provides a high-level signal, KD provides a low-level signal, TR2 is turned on, S0 is turned off, and the first end of CG2 is connected to the second end of CG2 to release the charge in CG2;

In the second integration period, SR provides a low-level signal, KD provides a high-level signal, TR2 is turned off, S0 is turned on, and D1 converts the received red light signal into the second first photocurrent, the second first photocurrent is written into the first end of CG2 through TR and TG2 that are turned on; the second first photocurrent flows to the second integrating capacitor CG2, a voltage drop is formed on the second integrating capacitor CG2, that is, the second first photocurrent starts to accumulate on the second integrating capacitor CG2 to realize the integration function; S0 is turned on, and the integrated voltage is stored on the storage capacitor C0; Vo1 is equal to Vref−(Ir2×t0/Cz2), where Vo1 is the potential of the output end of the operational amplifier O0 at the end of integration, Ir2 is the current value of the second first photocurrent, t0 is the integration time, Cz2 is the capacitance value of CG2; the integration time t0 during which S0 continues to be on in the second integration period, for example, the integration time t0 may be 100 us; at the end of integration, the voltage value of the analog output voltage outputted by the operational amplifier O0 is Vo1, and the analog output voltage is written into the input end of the analog-to-digital converter A0 through the filter circuit, and the analog-to-digital converter A0 performs analog-to-digital conversion on the analog output voltage to obtain the corresponding output digital signal, and writes the output digital signal into the micro-control unit. 80, the output processing unit in the micro-control unit 80 obtains the characteristics of the corresponding red light signal according to the output digital signal;

In the third sampling period S13, KR provides a high-level signal, KG, KB and KW all provide a low-level signal, G3 provides a high-level signal, G1, G2, G4 and G5 all provide a low-level signal, and TR is turned on, TG, TB and TW are turned off, TG3 is turned on, TG1, TG2, TG4 and TG5 are all turned off; the third sampling period S13 includes a third reset period and a third integration period set successively;

In the third reset period, SR provides a high-level signal, KD provides a low-level signal, TR3 is turned on, and the first end of CG3 is connected to the second end of CG3 to release the charge in CG3;

In the third integration period, SR provides a low-level signal, KD provides a high-level signal, TR3 is turned off, S0 is turned on, and D1 converts the received red light signal into the third first photocurrent, the third first photocurrent is written into the first end of CG3 through TR and TG3 that are turned on; the third first photocurrent flows to the third integrating capacitor CG3, a voltage drop is formed on CG3, that is, the third first photocurrent starts to accumulate on the third integrating capacitor CG3 to realize the integrating function; S0 is turned on, and the integrated voltage is stored on the storage capacitor C0; Vo1 is equal to Vref−(Ir3×t0/Cz3), Vo1 is the potential of the output end of the operational amplifier O0 when the integration is completed, Ir3 is the current value of the third first photocurrent, t0 is the integration time, Cz3 is the capacitance value of CG3; the integration time t0 is the time during which the S0 continues to be turned on in the third integration period, for example, the integration time t0 may be 100 us; at the end of the integration, the voltage value of the analog output voltage outputted by the operational amplifier O0 is Vo1, and the analog output voltage is written to the input end of the analog-to-digital converter A0 through the filter circuit, the analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding red light signal according to the output digital signal;

In the fourth sampling period S14, KR provides a high-level signal, KG, KB and KW all provide a low-level signal, G4 provides a high-level signal, G1, G2, G3 and G5 all provide a low-level signal, and TR is turned on, TG, TB and TW are turned off, TG4 is turned on, TG1, TG2, TG3 and TG5 are all turned off; the fourth sampling period S14 includes a fourth reset period and a fourth integration period set successively;

In the fourth reset period, SR provides a high-level signal, KD provides a low-level signal, TR4 is turned on, and the first end of CG4 is connected to the second end of CG4 to release the charge in CG4;

In the fourth integration period, SR provides a low-level signal, KD provides a high-level signal, TR4 is turned off, S0 is turned on, and D1 converts the received red light signal into the fourth first photocurrent, the fourth first photocurrent is written into the first end of CG4 through TR and TG4 that are turned on; the fourth first photocurrent starts to accumulate on the fourth integrating capacitor CG4 to realize the integration function; S0 is turned on, and the integration voltage is stored on the storage capacitor C0; Vo1 is equal to Vref−(Ir4×t0/Cz4), where Vo1 is the potential of the output end of the operational amplifier O0 at the end of the integration, and Ir4 is the current value of the fourth first photocurrent, t0 is the integration time, Cz4 is the capacitance value of CG4; the integration time t0 is the time during which S0 continues to be turned on in the fourth integration time period, for example, the integration time t0 can be 100 us; when the integration ends, the voltage value of the analog output voltage outputted by the operational amplifier O0 is Vo1, the analog output voltage is written into the input end of the analog-to-digital converter A0 after passing through the filter circuit, and the analog-to-digital converter A0 performs the analog-to-digital conversion on the analog output voltage to obtain the corresponding output digital signal, and the output digital signal is written into the micro-control unit 80. The output processing unit in the micro-control unit 80 obtains the characteristics of the corresponding red light signal according to the output digital signal;

In the fifth sampling period S15, KR provides a high-level signal, KG, KB and KW all provide a low-level signal, G5 provides a high-level signal, G1, G2, G3 and G4 all provide a low-level signal, and TR is turned on, TG, TB and TW are turned off, TG5 is turned on, TG1, TG2, TG3 and TG4 are all turned off; the fifth sampling period S15 includes a fifth reset period and a fifth integration period set successively;

In the fifth reset period, SR provides a high-level signal, KD provides a low-level signal, TR5 is turned on, and the first end of CG5 is connected to the second end of CG5 to release the charge in CG5;

In the fifth integration period, SR provides a low-level signal, KD provides a high-level signal, TR5 is turned off, S0 is turned on, and D1 converts the received red light signal into the fifth first photocurrent, the fifth first photocurrent is written into the first end of CG5 through TR and TG5 that are turned on; the fifth first photocurrent flows to the fifth integrating capacitor CG5, a voltage drop is formed on CG5, that is, the fifth first photocurrent starts to accumulate on the fifth integrating capacitor CG5 to realize the integration function; S0 is turned on, and the integrated voltage is saved to the storage capacitor C0; Vo1 is equal to Vref−(Ir5×t0/Cz5), where Vo1 is the potential of the output end of the operational amplifier O0 at the end of the integrating, Ir5 is the current value of the fifth first photocurrent, t0 is the integration time, Cz5 is the capacitance value of CG5; the integration time t0 is the time during which S0 continues to be turned on in the fifth integration time, for example, the integration time t0 can be 100 us; at the end of the integration, the voltage value of the analog output voltage outputted by the operational amplifier O0 is Vo1, and the analog output voltage is written to the input end of the analog-to-digital converter A0 through the filter circuit, the analog-to-digital converter A0 performs analog-to-digital conversion on the analog output voltage to obtain the corresponding output digital signal, and writes the output digital signal into the micro-control unit 80, so the output processing unit in the micro-control unit 80 obtains the characteristics of the corresponding red light signal according to the output digital signal;

In the sixth sampling period S21, KG provides a high-level signal, KR, KB and KW all provide a low-level signal, G1 provides a high-level signal, G2, G3, G4 and G5 all provide a low-level signal, TG is turned on, TR, TB and TW are turned off, TG1 is turned on, TG2, TG3, TG4 and TG5 are all turned off; the sixth sampling period S21 includes a sixth reset period and a sixth integration period set successively;

In the sixth reset period, SR provides a high-level signal, KD provides a low-level signal, TR1 is turned on, S0 is turned off, and the first end of CG1 and the second end of CG1 are connected to release the charge in CG1;

In the sixth integration period, SR provides a low-level signal, KD provides a high-level signal, TR1 is turned off, and D2 converts the received green light signal into the first second photocurrent, the first second photocurrent is written to the first end of CG1 through TG and TG1 that are turned on; the first second photocurrent flows to the first integrating capacitor CG1, a voltage drop is formed on CG1, that is, the first second photocurrent starts to accumulate on the first integration capacitor CG1 to realize the integration function; S0 is turned on, and the integration voltage is saved to the storage capacitor C0; Vo1 is equal to Vref−(Ig1×t0/Cz1), where Vo1 is the potential of the output end of the operational amplifier O0 at the end of integration, Ig1 is the current value of the first second photocurrent, t0 is the integration time, Cz1 is the capacitance value of CG1; the integration time t0 is the time during which S0 continues to be on in the sixth integration period, for example, the integration time t0 can be 100 us; at the end of integration, the voltage value of the analog output voltage outputted by the operational amplifier O0 is Vo1, and the analog output voltage is written into the input end of the analog-to-digital converter A0 after passing through the filter circuit. The analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding green light signal according to the output digital signal;

In the seventh sampling period S22, KG provides a high-level signal, KR, KB and KW all provide a low-level signal, G2 provides a high-level signal, G1, G3, G4 and G5 all provide a low-level signal, TG is turned on, TR, TB and TW are turned off, TG2 is turned on, TG1, TG3, TG4 and TG5 are all turned off; the seventh sampling time period S22 includes a seventh reset period and a seventh integration period set successively;

In the seventh reset period, SR provides a high-level signal, KD provides a low-level signal, TR2 is turned on, and the first end of CG2 and the second end of CG2 are connected to release the charge in CG2;

In the seventh integration period, SR provides a low-level signal, KD provides a high-level signal, TR2 is turned off, S0 is turned on, and D2 converts the received green light signal into a second second photocurrent. The second second photocurrent is written into the first end of CG2 through TG and TG2 that are turned on; the second second photocurrent flows to the second integrating capacitor CG2, a voltage drop is formed on CG2, that is, the second second photocurrent starts to accumulate on the second integrating capacitor CG2 to realize the integration function; S0 is turned on, and the integrated voltage is saved to the storage capacitor C0; Vo1 is equal to Vref−(Ig2×t0/Cz2), Vo1 is the potential of the output end of the operational amplifier O0 at the end of the integration, Ig2 is the current value of the second second photocurrent, t0 is the integration time, Cz2 is the capacitance value of CG2; the integration time to is the time during which S0 continues to be turned on in the seventh integration time, for example, the integration time t0 can be 100 us; at the end of the integration, the voltage value of the analog output voltage outputted by the operational amplifier O0 is Vo1, and the analog output voltage is written into the input end of the analog-to-digital converter A0 through the filter circuit, the analog-to-digital converter A0 performs analog-to-digital conversion on the analog output voltage to obtain the corresponding output digital signal, and writes the output digital signal into the micro-control unit 80, so the output processing unit in the micro-control unit 80 obtains the characteristics of the corresponding green light signal according to the output digital signal;

In the eighth sampling period S23, KG provides a high-level signal, KR, KB and KW all provide a low-level signal, G3 provides a high-level signal, and G1, G2, G4 and G5 all provide a low-level signal, TG is turned on, TR, TB and TW are turned off, TG3 is turned on, and TG1, TG2, TG4 and TG5 are all turned off; the eighth sampling period S23 includes an eighth reset period and an eighth integration period set successively;

In the eighth reset period, SR provides a high-level signal, KD provides a low-level signal, TR3 is turned on, and the first end of CG3 is connected to the second end of CG3 to release the charge in CG3;

In the eighth integration period, SR provides a low-level signal, KD provides a high-level signal, TR3 is turned off, S0 is turned on, and D2 converts the received green light signal into a third second photocurrent, the third second photocurrent is written into the first end of CG3 through TG and TG3 that are turned on; the third second photocurrent flows to the third integrating capacitor CG3, a voltage drop is formed on CG3, that is, the third second photocurrent flows to the third integrating capacitor CG3. The second photocurrent starts to accumulate on the third integrating capacitor CG3 to realize the integrating function; S0 is turned on, and the integrated voltage is saved to the storage capacitor C0; Vo1 is equal to Vref−(Ig3×t0/Cz3), Vo1 is the potential of the output end of the operational amplifier O0 at the end of integration, Ig3 is the current value of the third second photocurrent, t0 is the integration time, Cz3 is the capacitance value of CG3; the integration time t0 is the time during which S0 continues to be turned in the eighth integration time, for example, the integration time t0 can be 100 us; at the end of the integration, the voltage value of the analog output voltage outputted by the operational amplifier O0 is Vo1, and the analog output voltage is written into the input end of the analog-to-digital converter A0 through the filter circuit, the analog-to-digital converter A0 performs analog-to-digital conversion on the analog output voltage to obtain the corresponding output digital signal, and writes the output digital signal into the micro-control unit 80, so the output processing unit in the micro-control unit 80 obtains the characteristics of the corresponding green light signal according to the output digital signal;

In the ninth sampling period S24, KG provides a high-level signal, KR, KB and KW all provide a low-level signal, G4 provides a high-level signal, G1, G2, G3 and G5 all provide a low-level signal, TG is turned on, TR, TB and TW are turned off, TG4 is turned on, TG1, TG2, TG3 and TG5 are all turned off; the ninth sampling period S24 includes a ninth reset period and a ninth integration period set successively;

In the ninth reset period, SR provides a high-level signal, KD provides a low-level signal, TR4 is turned on, and the first end of CG4 and the second end of CG4 are connected to release the charge in CG4;

In the ninth integration time period, SR provides a low-level signal, KD provides a high-level signal, TR4 is turned off, S0 is turned on, and D2 converts the received green light signal into a fourth second photocurrent. The fourth second photocurrent is written into the first end of CG4 through TG and TG4 that are turned on; the fourth second photocurrent flows to the fourth integrating capacitor CG4, a voltage drop is formed on CG4, that is, the fourth second photocurrent starts to accumulate on the fourth integrating capacitor CG4 to realize the integration function; S0 is turned on, and the integrated voltage is saved to the storage capacitor C0; Vo1 is equal to Vref−(Ig4×t0/Cz4), where Vo1 is the potential of the output end of the operational amplifier O0 at the end of the integrating, Ig4 is the current value of the fourth second photocurrent, t0 is the integration time, Cz4 is the capacitance value of CG4; the integration time t0 is the time during which S0 continues to be turned on in the ninth integration period, for example, the integration time t0 can be 100 us; at the end of the integration, the voltage value of the analog output voltage outputted by the operational amplifier O0 is Vo1, and the analog output voltage is written into the input end of the analog-to-digital converter A0 through the filter circuit, the analog-to-digital converter A0 performs analog-to-digital conversion on the analog output voltage to obtain the corresponding output digital signal, and writes the output digital signal into the micro-control unit 80, so the output processing unit in the micro-control unit 80 obtains the characteristics of the corresponding green light signal according to the output digital signal;

In the tenth sampling period S25, KG provides a high-level signal, KR, KB and KW all provide a low-level signal, G5 provides a high-level signal, G1, G2, G3 and G4 all provide a low-level signal, TG is turned on, TR, TB and TW are turned off, TG5 is turned on, TG1, TG2, TG3 and TG4 are all turned off; the tenth sampling period S25 includes a tenth reset period and a tenth integration period set successively;

In the tenth reset period, SR provides a high-level signal, KD provides a low-level signal, TR5 is turned on, and the first end of CG5 is connected to the second end of CG5 to release the charge in CG5;

In the tenth integration period, SR provides a low-level signal, KD provides a high-level signal, TR5 is turned off, S0 is turned on, and D2 converts the received green light signal into a fifth second photocurrent, the fifth second photocurrent is written into the first end of CG5 through TG and TG5 that are turned on; the fifth second photocurrent flows to the fifth integrating capacitor CG5, a voltage drop is formed on CG5, that is, the fifth second photocurrent flows to the fifth integrating capacitor CG5. The second photocurrent starts to accumulate on the fifth integrating capacitor CG5 to realize the integrating function; S0 is turned on, and the integrated voltage is saved on the storage capacitor C0; Vo1 is equal to Vref−(Ig5×t0/Cz5), where Vo1 is the potential of the output end of the operational amplifier O0 at the end of integration, Ig5 is the current value of the fifth second photocurrent, t0 is the integration time, Cz5 is the capacitance value of CG5; the integration time t0 is the time during which S0 continues to be turned on in the tenth integration period, for example, the integration time t0 can be 100 us; at the end of the integration, the voltage value of the analog output voltage outputted by the operational amplifier O0 is Vo1, and the analog output voltage is written into the input end of the analog-to-digital converter A0 through the filter circuit, the analog-to-digital converter A0 performs analog-to-digital conversion on the analog output voltage to obtain the corresponding output digital signal, and writes the output digital signal into the micro-control unit 80, so the output processing unit in the micro-control unit 80 obtains the characteristics of the corresponding green light signal according to the output digital signal;

In the eleventh sampling period S31, KB provides a high-level signal, KR, KG and KW all provide a low-level signal, G1 provides a high-level signal, G2, G3, G4 and G5 all provide a low-level signal, TB is turned on, TR, TG and TW are turned off, TG1 is turned on, TG2, TG3, TG4 and TG5 are all turned off; the eleventh sampling period S31 includes an eleventh reset period and an eleventh integration period set successively;

In the eleventh reset period, SR provides a high-level signal, KD provides a low-level signal, TR1 is turned on, and the first end of CG1 is connected to the second end of CG1 to release the charge in CG1;

In the eleventh integration period, SR provides a low-level signal, KD provides a high-level signal, TR1 is turned off, S0 is turned on, and D3 converts the received blue light signal into the first third photocurrent. The first third photocurrent is written to the first end of CG1 through TB and TG1 that are turned on; the first third photocurrent flows to the first integrating capacitor CG1, a voltage drop is formed on CG1, that is, the first third photocurrent starts to accumulate on the first integrating capacitor CG1 to realize the integrating function; S0 is turned on, and the integrated voltage is saved to the storage capacitor C0; Vo1 is equal to Vref−(Ib1×t0/Cz1), where Vo1 is the potential of the output end of the operational amplifier O0 at the end of the integration, Ib1 is the current value of the first third photocurrent, t0 is the integration time, Cz1 is the capacitance value of CG1; the integration time t0 is the time during which S0 continues to be turned on in the eleventh integration time, for example, the integration time t0 may be 100 us; when the integration ends, the voltage value of the analog output voltage outputted by the operational amplifier O0 is Vo1, and the analog output voltage is written into the input end of the analog-to-digital converter A0 through the filtering circuit, and the analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding blue light signal according to the output digital signal;

In the twelfth sampling period S32, KB provides a high-level signal, KR, KG and KW all provide a low-level signal, G2 provides a high-level signal, G1, G3, G4 and G5 all provide a low-level signal, TB is turned on, TR, TG and TW are turned off, TG2 is turned on, TG1, TG3, TG4 and TG5 are all turned off; the twelfth sampling period S32 includes a twelfth reset period and a twelfth integration period set successively;

In the twelfth reset period, SR provides a high-level signal, KD provides a low-level signal, TR2 is turned on, and the first end of CG2 is connected to the second end of CG2 to release the charge in CG2;

In the twelfth integration period, SR provides a low-level signal, KD provides a high-level signal, TR2 is turned off, S0 is turned on, and D3 converts the received blue light signal into the second third photocurrent. The second third photocurrent is written to the first end of CG2 through TB and TG2 that are turned on; the second third photocurrent flows to the second integrating capacitor CG2, a voltage drop is formed on CG2, that is, the second third photocurrent starts to accumulate on the second integrating capacitor CG2 to realize the integrating function; S0 is turned on, and the integrated voltage is saved to the storage capacitor C0; Vo1 is equal to Vref−(Ib2×t0/Cz2), where Vo1 is the potential of the output end of the operational amplifier O0 at the end of the integration, Ib2 is the current value of the second third photocurrent, t0 is the integration time, Cz2 is the capacitance value of CG2; The integration time t0 is the time during which S0 continues to be turned on in the twelfth integration period, for example, the integration time t0 may be 100 us; when the integration ends, the voltage value of the analog output voltage outputted by the operational amplifier O0 is Vo1, and the analog output voltage is written into the input end of the analog-to-digital converter A0 through the filtering circuit, and the analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding blue light signal according to the output digital signal;

In the thirteenth sampling period S33, KB provides a high-level signal, KR, KG and KW all provide a low-level signal, G3 provides a high-level signal, G1, G2, G4 and G5 all provide a low-level signal, TB is turned on, TR, TG and TW are turned off, TG3 is turned on, TG1, TG2, TG4 and TG5 are all turned off; the thirteenth sampling period S33 includes a thirteenth reset period and a thirteenth integration period set successively;

In the thirteenth reset period, SR provides a high-level signal, KD provides a low-level signal, TR3 is turned on, and the first end of CG3 is connected to the second end of CG3 to release the charge in CG3;

In the thirteenth integration period, SR provides a low-level signal, KD provides a high-level signal, TR3 is turned off, S0 is turned on, and D3 converts the received blue light signal into a third third photocurrent, the third third photocurrent is written into the first end of CG3 through TB and TG3 that are turned on; the third third photocurrent flows to the third integrating capacitor CG3, a voltage drop is formed on CG3, that is, the third third photocurrent starts to accumulate on the third integrating capacitor CG3 to realize the integrating function; S0 is turned on, and the integrated voltage is saved to the storage capacitor C0; Vo1 is equal to Vref−(Ib3×t0/Cz3), where Vo1 is the potential of the output end of the operational amplifier O0 at the end of the integration, Ib3 is the current value of the third third photocurrent, t0 is the integration time, Cz3 is the capacitance value of CG3; the integration time t0 is the time during which S0 continues to be turned on in the thirteenth integration period, for example, the integration time t0 may be 100 us; when the integration ends, the voltage value of the analog output voltage outputted by the operational amplifier O0 is Vo1, and the analog output voltage is written into the input end of the analog-to-digital converter A0 through the filtering circuit, and the analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding blue light signal according to the output digital signal;

In the fourteenth sampling period S34, KB provides a high-level signal, KR, KG and KW all provide a low-level signal, G4 provides a high-level signal, G1, G2, G3 and G5 all provide a low-level signal, TB is turned on, TR, TG and TW are turned off, TG4 is turned on, TG1, TG2, TG3 and TG5 are all turned off; the fourteenth sampling period S34 includes a fourteenth reset period and a fourteenth integration period set successively;

In the fourteenth reset period, SR provides a high-level signal, KD provides a low-level signal, TR4 is turned on, and the first end of CG4 is connected to the second end of CG4 to release the charge in CG4;

In the fourteenth integration period, SR provides a low-level signal, KD provides a high-level signal, TR4 is turned off, S0 is turned on, and D3 converts the received blue light signal into the fourth third photocurrent, the fourth third photocurrent is written to the first end of CG4 through TB and TG4 that are turned on; the fourth third photocurrent flows to the fourth integrating capacitor CG4, a voltage drop is formed on CG4, that is, the fourth third photocurrent flows to the fourth integrating capacitor CG4. The third photocurrent starts to accumulate on the fourth integrating capacitor CG4 to realize the integrating function; S0 is turned on, and the integrated voltage is saved to the storage capacitor C0;

Vo1 is equal to Vref−(Ib4×t0/Cz4), where Vo1 is the potential of the output end of the operational amplifier O0 at the end of the integration, Ib4 is the current value of the fourth third photocurrent, t0 is the integration time, Cz4 is the capacitance value of CG4; the integration time t0 is the time during which S0 continues to be turned on in the fourteenth integration time, for example, the integration time t0 may be 100 us; when the integration ends, the voltage value of the analog output voltage outputted by the operational amplifier O0 is Vo1, and the analog output voltage is written into the input end of the analog-to-digital converter A0 through the filtering circuit, and the analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding blue light signal according to the output digital signal;

In the fifteenth sampling period S35, KB provides a high-level signal, KR, KG and KW all provide a low-level signal, G5 provides a high-level signal, G1, G2, G3 and G4 all provide a low-level signal, TB is turned on, TR, TG and TW are turned off, TG5 is turned on, TG1, TG2, TG3 and TG4 are all turned off; the fifteenth sampling period S35 includes a fifteenth reset period and a fifteenth integration period set successively;

In the fifteenth reset period, SR provides a high-level signal, KD provides a low-level signal, TR5 is turned on, and the first end of CG5 is connected to the second end of CG5 to release the charge in CG5;

In the fifteenth integration period, SR provides a low-level signal, KD provides a high-level signal, TR5 is turned off, S0 is turned on, and D3 converts the received blue light signal into the fifth third photocurrent, the fifth third photocurrent is written into the first end of CG5 through TB and TG5 that are turned on; the fifth third photocurrent flows to the fifth integrating capacitor CG5, a voltage drop is formed on CG5, that is, the fifth third photocurrent flows to the fifth integrating capacitor CG5. The third photocurrent starts to accumulate on the fifth integrating capacitor CG5 to realize the integrating function; S0 is turned on, and the integrated voltage is saved to the storage capacitor C0; Vo1 is equal to Vref−(Ib5×t0/Cz5), where Vo1 is the potential of the output end of the operational amplifier O0 at the end of the integration, Ib5 is the current value of the fifth third photocurrent, t0 is the integration time, Cz5 is the capacitance value of CG5; the integration time t0 is the time during which S0 continues to be turned on in the fifteenth integration period, for example, the integration time t0 may be 100 us; when the integration ends, the voltage value of the analog output voltage outputted by the operational amplifier O0 is Vo1, and the analog output voltage is written into the input end of the analog-to-digital converter A0 through the filtering circuit, and the analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding blue light signal according to the output digital signal;

In the sixteenth sampling period S41, KW provides a high-level signal, KR, KG and KB all provide a low-level signal, G1 provides a high-level signal, G2, G3, G4 and G5 all provide a low-level signal, TW is turned on, TR, TG and TB are turned off, TG1 is turned on, TG2, TG3, TG4 and TG5 are all turned off; the sixteenth sampling period S41 includes a sixteenth reset period and a sixteenth integration period set successively;

In the sixteenth reset period, SR provides a high-level signal, KD provides a low-level signal, TR1 is turned on, and the first end of CG1 is connected to the second end of CG1 to release the charge in CG1;

In the sixteenth integration period, SR provides a low-level signal, KD provides a high-level signal, TR1 is turned off, S0 is turned on, and D4 converts the received white light signal into the first fourth photocurrent. The first fourth photocurrent is written into the first end of CG1 through TW and TG1 that are turned on; the first fourth photocurrent flows to the first integrating capacitor CG1, a voltage drop is formed on CG1, that is, the first fourth photocurrent starts to accumulate on the first integrating capacitor CG1 to realize the integration function; S0 is turned on, and the integrated voltage is saved to the storage capacitor C0; Vo1 is equal to Vref−(Iw1×t0/Cz1), where Vo1 is the potential of the output end of the operational amplifier O0 at the end of the integration, Iw1 is the current value of the first and fourth photocurrents, t0 is the integration time, Cz1 is the capacitance value of CG1; The integration time t0 is the time during which S0 continues to be turned on in the sixteenth integration period, for example, the integration time t0 may be 100 us; when the integration ends, the voltage value of the analog output voltage outputted by the operational amplifier O0 is Vo1, and the analog output voltage is written into the input end of the analog-to-digital converter A0 through the filtering circuit, and the analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding white light signal according to the output digital signal;

In the seventeenth sampling period S42, KB provides a high-level signal, KR, KG and KW all provide a low-level signal, G2 provides a high-level signal, G1, G3, G4 and G5 all provide a low-level signal, TW is turned on, TR, TG and TB are turned off, TG2 is tuned on, TG1, TG3, TG4 and TG5 are all turned off; the seventeenth sampling period S42 includes a seventeenth reset period and a seventeenth integration period set successively;

In the seventeenth reset period, SR provides a high-level signal, KD provides a low-level signal, TR2 is turned on, S0 is turned off, and the first end of CG2 and the second end of CG2 are connected to release the CG2 charge;

In the seventeenth integration time period, SR provides a low-level signal, KD provides a high-level signal, TR2 is turned off, S0 is turned on, and D4 converts the received white light signal into the second fourth photocurrent. The second fourth photocurrent is written to the first end of CG2 through TW and TG2 that are turned on; the second fourth photocurrent flows to the second integrating capacitor CG2, a voltage drop is formed on CG2, that is, the second fourth photocurrent flows to the second integrating capacitor CG2. The fourth photocurrent starts to accumulate on the second integrating capacitor CG2 to realize the integration function; S0 is turned on, and the integrated voltage is saved to the storage capacitor C0; Vo1 is equal to Vref−(Iw2×t0/Cz2), where Vo1 is the potential of the output end of the operational amplifier O0 at the end of the integration, Iw2 is the current value of the second and fourth photocurrent, t0 is the integration time, Cz2 is the capacitance value of CG2; The integration time t0 is the time during which S0 continues to be turned on in the seventeenth integration period, for example, the integration time t0 may be 100 us; when the integration ends, the voltage value of the analog output voltage outputted by the operational amplifier O0 is Vo1, and the analog output voltage is written into the input end of the analog-to-digital converter A0 through the filtering circuit, and the analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding white light signal according to the output digital signal;

In the eighteenth sampling period S43, KW provides a high-level signal, KR, KG and KB all provide a low-level signal, G3 provides a high-level signal, G1, G2, G4 and G5 all provide a low-level signal, TB is turned on, TR, TG and TW are turned off, TG3 is turned on, TG1, TG2, TG4 and TG5 are all turned off; the eighteenth sampling period S33 includes an eighteenth reset period and an eighteenth integration period set successively;

In the eighteenth reset period, SR provides a high-level signal, KD provides a low-level signal, TR3 is turned on, S0 is turned off, and the first end of CG3 is connected to the second end of CG3 to release the CG3 charge;

In the eighteenth integration period, SR provides a low-level signal, KD provides a high-level signal, TR3 is turned off, S0 is turned on, and D4 converts the received white light signal into the third fourth photocurrent. The third fourth photocurrent is written into the first end of CG3 through TW and TG3 that are turned on; the third fourth photocurrent flows to the third integrating capacitor CG3, a voltage drop is formed on CG3, that is, the third fourth photocurrent starts to accumulate on the third integrating capacitor CG3 to realize the integrating function; S0 is turned on, and the integrated voltage is saved to the storage capacitor C0; Vo1 is equal to $V_{ref}-(I_{w3} \times t0/C_{z3})$, where Vo1 is the potential of the output end of the operational amplifier O0 at the end of the integration, Iw3 is the current value of the third and fourth photocurrents, t0 is the integration time, Cz3 is the capacitance value of CG3; the integration time t0 is the time during which S0 continues to be turned on in the eighteenth integration period, for example, the integration time t0 may be 100 us; when the integration ends, the voltage value of the analog output voltage outputted by the operational amplifier O0 is Vo1, and the analog output voltage is written into the input end of the analog-to-digital converter A0 through the filtering circuit, and the analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding white light signal according to the output digital signal;

In the nineteenth sampling period S44, KW provides a high-level signal, KR, KG and KB all provide a low-level signal, G4 provides a high-level signal, G1, G2, G3 and G5 all provide a low-level signal, TW is turned on, TR, TG and TB are turned off, TG4 is turned on, TG1, TG2, TG3 and TG5 are all turned off; the nineteenth sampling period S44 includes a nineteenth reset period and a nineteenth integration period set successively;

In the nineteenth reset period, SR provides a high-level signal, KD provides a low-level signal, TR4 is turned on, S0 is turned off, and the first end of CG4 and the second end of CG4 are connected to release the CG4 charge;

In the nineteenth integration time period, SR provides a low-level signal, KD provides a high-level signal, TR4 is turned off, S0 is turned on, and D4 converts the received white light signal into the fourth fourth photocurrent, the fourth fourth photocurrent is written into the first end of CG4 through TW and TG4 that are turned on; the fourth fourth photocurrent flows to the fourth integrating capacitor CG4, a voltage drop is formed on CG4, that is, the fourth fourth photocurrent flows to the fourth integrating capacitor CG4. The fourth photocurrent starts to accumulate on the fourth integrating capacitor CG1 to realize the integration function; S0 is turned on, and the integrated voltage is saved to the storage capacitor C0; Vo1 is equal to $V_{ref}-(I_{w4} \times t0/C_{z4})$, where Vo1 is the potential of the output end of the operational amplifier O0 at the end of the integration, Ib4 is the current value of the fourth third photocurrent, t0 is the integration time, Cz4 is the capacitance value of CG4; the integration time t0 is the time during which S0 continues to be turned on in the nineteenth integration period, for example, the integration time t0 may be 100 us; when the integration ends, the voltage value of the analog output voltage outputted by the operational amplifier O0 is Vo1, and the analog output voltage is written into the input end of the analog-to-digital converter A0 through the filtering circuit, and the analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding white light signal according to the output digital signal;

In the twentieth sampling period S45, KW provides a high-level signal, KR, KG and KB all provide a low-level signal, G5 provides a high-level signal, G1, G2, G3 and G4 all provide a low-level signal, TW is turned on, TR, TG and TB are turned off, TG5 is turned on, TG1, TG2, TG3 and TG4 are all tuned off; the twentieth sampling period S45 includes a twentieth reset period and a twentieth integration period set successively;

In the twentieth reset period, SR provides a high-level signal, KD provides a low-level signal, TR5 is turned on, S0 is turned off, and the first end of CG5 and the second end of CG5 are connected to release the charge;

In the twentieth integration time period, SR provides a low-level signal, KD provides a high-level signal, TR5 is turned off, S0 is turned on, and D4 converts the received white color light signal into the fifth fourth photocurrent. The fifth fourth photocurrent is written into the first end of CG5 through TW and TG5 that are turned on; the fifth fourth photocurrent flows to the fifth integrating capacitor CG5, a voltage drop is formed on CG5, that is, the fifth fourth photocurrent flows to the fifth integrating capacitor CG5. The fourth photocurrent starts to accumulate on the fifth integrating capacitor CG5 to realize the integration function; S0 is turned on, and the integrated voltage is saved to the storage capacitor C0; Vo1 is equal to $V_{ref}-(I_{w5} \times t0/C_{z5})$, where Vo1 is the potential of the output end of the operational amplifier O0 at the end of the integration, Iw5 is the current value of the fifth fourth photocurrent, t0 is the integration time, Cz5 is the capacitance value of CG5; The integration time t0 is the time during which S0 continues to be turned on in the twentieth integration period, for example, the integration time t0 may be 100 us; when the integration ends, the voltage value of the analog output voltage outputted by the operational amplifier O0 is Vo1, and the analog output voltage is written into the input end of the analog-to-digital converter A0 through the filtering circuit, and the analog-to-digital converter A0 performs analog-to-digital conversion on the analog output voltage to obtain the corresponding output digital signal, and writes the output digital signal into the micro-control unit 80, the output processing unit in the micro-control unit 80 obtains the characteristics of the corresponding white light signal according to the output digital signal.

When the light detection module shown in FIG. 6 of the present disclosure is in operation, KD provides a low-level signal, S0 can be turned off, but not limited thereto.

When the voltage conversion range of the analog-to-digital converter A0 is greater than or equal to 0V and less than or equal to 3.64V, and the number of bits of the output digital signal output by the analog-to-digital converter A0 is 16, the present disclosure is as shown in FIG. 6. When at least one embodiment of the detection module is in operation, When collecting by using the first position, the first end of CG1 is connected to the inverting input end of O0, the capacitance value of CG1 is 0.1 pF, the integration time is 100 us, and the high-precision voltage conversion range of digital-to-analog converter A0 is greater than or equal to 0.2V and less than or equal to 2V, the photocurrent range that can be accurately detected by the first position is greater than or equal to 200 pA and less than or equal to 2000 pA, and the current sampling accuracy is 0.06 pA/LSB; LSB is the least significant bit; when collecting by using the first position, the transfer coefficient is t0/Cz1, t0 is the integration time, and Cz1 is the capacitance value of the first integration capacitor CG1;

When collecting by using the second position, the first end of CG2 is connected to the inverting input end of O0, the capacitance value of CG2 is 1 pF, the integration time is 100 us, and the high-precision voltage conversion range of digital-to-analog converter A0 is greater than is equal to 0.2V but less than or equal to 2V, the photocurrent range that can be accurately detected by the second position is greater than or equal to 2 nA and less than or equal to 20 nA, and the current sampling accuracy is 0.56 pA/LSB; and when collecting by using the second position, the transfer coefficient is t0/Cz2, t0 is the integration time, and Cz2 is the capacitance value of the second integration capacitor CG2;

When collecting by using the third position, the first end of CG3 is connected to the inverting input end of O0, the capacitance value of CG2 is 10 pF, the integration time is 100 us, and the high-precision voltage conversion range of digital-to-analog converter A0 is greater than is equal to 0.2V but less than or equal to 2V, the photocurrent range that can be accurately detected by the third position is greater than or equal to 20 nA and less than or equal to 200 nA, and the current sampling accuracy is 5.6 pA/LSB; and when collecting by using the third position, the transfer coefficient is t0/Cz3, t0 is the integration time, and Cz3 is the capacitance value of the third integration capacitor CG3;

When collecting by using the fourth position, the first end of CG4 is connected to the inverting input end of O0, the capacitance value of CG2 is 100 pF, the integration time is 100 us, and the high-precision voltage conversion range of digital-to-analog converter A0 is greater than equal to 0.2V but less than or equal to 2V, the photocurrent range that can be accurately detected by the fourth position is greater than or equal to 200 nA and less than or equal to 2000 nA, and the current sampling accuracy is 56 pA/LSB; and when collecting by using the fourth position, the transfer coefficient is t0/Cz4, t0 is the integration time, and Cz4 is the capacitance value of the fourth integration capacitor CG4;

When collecting by using the fifth position, the first end of CG5 is connected to the inverting input end of O0, the capacitance value of CG5 is 10 pF, the integration time is 100 us, and the high-precision voltage conversion range of digital-to-analog converter A0 is greater than equal to 0.2V but less than or equal to 2V, the photocurrent range that can be accurately detected by the fifth position is greater than or equal to 2 uA and less than or equal to 20 uA, and the current sampling accuracy is 560 pA/LSB; and when collecting by using the fifth position, the transfer coefficient is t0/Cz5, t0 is the integration time, and Cz5 is the capacitance value of the fifth integration capacitor CG5;

The analog-to-digital converter A0 converts the voltage of one LSB to 55.58 uV/LSB, and the LSB is the least significant bit.

As can be seen from the above, the photocurrent range that can be collected by the light detection module shown in FIG. 6 of at least one embodiment of the present disclosure is greater than or equal to 200 pA and less than or equal to 20 uA. In order to detect the photocurrent of 200 pA, the collection accuracy and the OS leakage current of the operational amplifier O0 (the OS leakage current of the operational amplifier O0 is the leakage current of the inverting and non-inventing input ends of the operational amplifier O0) is related, that is, if the collecting error is 10%, the OS leakage current of the operational amplifier O0 is at least one order of magnitude smaller.

During operation of the light detection module shown in FIG. 6 of at least one embodiment of the present disclosure, a sampling time period includes a first sampling phase, a second sampling phase, a third sampling phase, and a fourth sampling phase. The first photocurrent corresponding to the red light signal is sampled in the first sampling phase, the second photocurrent corresponding to the green light signal is sampled in the second sampling phase, the third photocurrent corresponding to the blue light signal is sampled in the third sampling phase, and the fourth photocurrent corresponding to the white light signal is sampled in the fourth sampling phase;

Each sampling phase includes five sampling periods set in sequence, in the five sampling periods set in sequence, TG1, TG2, TG3, TG4, TG5 are controlled to be turned on in sequence; the first sampling period included in each sampling phase, TG1 is turned on, TG2, TG3, TG4 and TG5 are turned off, and the first end of CG1 is connected to the inverting input end of the operational amplifier O0; in the second sampling period included in each sampling phase, TG2 is turned on, TG1, TG3, TG4 and TG5 are turned off, and the first end of CG2 is connected to the inverting input end of the operational amplifier O0; in the third sampling period included in each sampling phase, TG3 is turned on, TG1, TG2, TG4 and TG5 are turned off, and the first end of RS3 is connected to the inverting input end of the operational amplifier O0; in the fourth sampling period included in each sampling phase, TG4 is turned on, TKG1, TG2, TG3 and TG5 are turned off, the first end of CG4 is connected to the inverting input end of the operational amplifier O0; in the fifth sampling period included in each sampling phase, TG5 is turned on, TKG1, TG2, TG3 and TG4 are turned off, and the first end of CG5 is connected to the inverting input end of the operational amplifier O0;

At the end of each integration, when the analog-to-digital converter A0 outputs an output digital signal, the output digital signal outputted by the analog-to-digital converter A0 is determined. When the voltage value of the input voltage corresponding to output digital signal outputted by the analog-to-digital converter A0 is less than or equal to the first voltage VS1 (the high-precision voltage conversion range of the analog-to-digital converter A0 is greater than or equal to the first voltage VS1 and less than or equal to the second voltage VS2), the corresponding output digital signal is discarded until the voltage value of the input voltage corresponding to the output digital signal is within the high-precision voltage conversion range of the analog converter A0, the current transfer coefficient is recorded (the transfer coefficient is related to the capacitance value and integration time of the corresponding integrating capacitor), the output digital signal outputted by the analog converter A0 is transmitted to the corresponding storage unit. After the entire sampling period is completed, the micro-control unit 80 can obtain the characteristics of each light signal according to the transfer coefficient and the output digital signal in the storage unit.

The light detection method described in the embodiment of the present disclosure is applied to the above-mentioned light detection module, and the light detection method includes:

Sensing, by N light sensing circuits, sense light signals of different colors respectively to generate corresponding photocurrents;

Controlling, by the control circuit, to provide the photocurrents generated by the light sensing circuits to the capacitance integrating amplifying circuit in a time division manner, and controlling a conversion parameter of the capacitance integrating amplifying circuit;

Converting, by the capacitance-integration conversion circuit, the photocurrent according to the conversion parameter and the integration time to obtain an analog output voltage;

Obtaining, by the processing circuit, the characteristics of the light signal according to the analog output voltage.

The light detection method described in the embodiments of the present disclosure adopts the current integration method through the capacitance integrating conversion circuit, and converts the photocurrent according to the integration time, so that the number of photodiodes connected in parallel in the light sensing circuit can be reduced by increasing the integration time, the area occupied by the photodiodes is reduced, thereby saving space and cost.

In at least one embodiment of the present disclosure, the control circuit includes a light sensing control sub-circuit, a sampling sub-circuit, and a capacitor control sub-circuit; the sampling sub-circuit includes M integrating capacitors; M is a positive integer;

The step of controlling, by the control circuit, to provide the photocurrents generated by the light sensing circuits to the conversion circuit in a time division manner includes: controlling, by the light sensing control sub-circuit, to provide the photocurrents generated by the light sensing circuits to the input end of the capacitance integrating conversion circuit in a time division manner under the control of the light sensing control signal; controlling, by the capacitor control sub-circuit, to connect the first ends of the integrating capacitors to the input end of the capacitance integrating conversion circuit in a time division manner under the control of the capacitor control signal;

The conversion parameter is the capacitance value of the integrating capacitor currently connected to the input end of the capacitance integrating conversion circuit.

In at least one embodiment of the present disclosure, the transfer coefficient of the capacitance integrating circuit may be a ratio of the integration time to the capacitance value of the integration capacitance currently connected to the input end of the capacitance integrating conversion circuit.

In a specific implementation, the control circuit may include a light sensing control sub-circuit, a sampling sub-circuit and a capacitor control sub-circuit, and the light sensing control sub-circuit controls to provide the photocurrents generated by the light sensing circuits to the capacitance integrating conversion circuit in a time division manner, the capacitor control sub-circuit controls the integrating capacitor connected to the input end of the capacitance integrating conversion circuit.

Optionally, the processing circuit includes an analog-to-digital converter and an output processing unit;

The step of obtaining, by the processing circuit, the characteristic of the light signal according to the analog output voltage include:

Converting, by the analog-to-digital converter, the analog output voltage into an output digital signal;

Obtaining, by the output processing unit, the characteristics of the light signal according to the output digital signal.

In at least one embodiment of the present disclosure, the high-precision voltage conversion range of the analog-to-digital converter is the range of the input voltage that the analog-to-digital converter can accurately perform analog-to-digital conversion; the voltage conversion range of the analog-to-digital converter is the range of the input voltage that the analog-to-digital converter A0 can perform analog-to-digital conversion; wherein, the input voltage is the voltage inputted to the analog-to-digital converter.

In at least one embodiment of the present disclosure, the high-precision voltage conversion range of the analog-to-digital converter is greater than or equal to the first voltage VS1 and less than or equal to the second voltage VS2, and the voltage conversion range of the analog-to-digital converter is greater than or equal to the third voltage VS3 and less than or equal to the fourth voltage VS3; the fourth voltage VS3 is greater than the second voltage VS2; the third voltage VS3 is less than the first voltage VS1;

The step of obtaining, by the output processing unit, characteristic of the light signal according to the output digital signal includes:

Determining, by the output processing unit, whether the voltage value of the input voltage corresponding to the output digital signal is within the high-precision voltage conversion range;

When the output processing unit determines that the voltage value of the input voltage corresponding to the output digital signal is smaller than the first voltage VS1 or greater than the second voltage VS2, determining, by the output processing unit, that the voltage value of the input voltage corresponding to the output digital signal is not within the high-precision voltage conversion range, discarding the digital output signal;

When the output processing unit determines that the voltage value of the input voltage corresponding to the output digital signal is greater than or equal to the first voltage VS1 and less than or equal to the second voltage VS2, determining, by the output processing unit, that the voltage value of the input voltage corresponding to the output digital signal is within the high-precision voltage conversion range, and obtaining, by the output processing unit, the characteristics of the light signal according to the digital output signal.

In a specific implementation, when the voltage value of the input voltage corresponding to the output digital signal is less than the first voltage VS1 or greater than the second voltage VS2, the voltage value of the input voltage connected to the input end of the analog-to-digital converter exceeds the high-precision voltage conversion range of the analog-to-digital converter, it is necessary to discard the output digital signal and use other integrating capacitors to resample.

The display device according to the embodiment of the present disclosure includes the above-mentioned light detection module.

The display device provided by the embodiments of the present disclosure may be any product or component with a display function, such as a mobile phone, a tablet computer, a television, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A light detection module, comprising N light sensing circuits, a control circuit, a capacitance integrating conversion circuit, and a processing circuit; N is a positive integer; wherein the N light sensing circuits respectively sense light signals of different colors to generate corresponding photocurrents;
   the control circuit is configured to control to provide photocurrents generated by the light sensing circuits to a capacitance integrating amplifying circuit in a time division manner, and to control a conversion parameter of the capacitance integrating amplifying circuit;
   the capacitance integrating conversion circuit is configured to perform integrating conversion on the photocurrent according to the conversion parameter and an integration time, to obtain an analog output voltage;
   the processing circuit is configured to obtain characteristics of the light signal according to the analog output voltage;
   wherein the capacitance integrating conversion circuit comprises a conversion sub-circuit, a sampling sub-circuit, and a sampling control sub-circuit; the control circuit comprises a light sensing control sub-circuit and a capacitor control sub-circuit; the sampling sub-circuit comprises M integrating capacitors; M is a positive integer;
   the light sensing control sub-circuit is configured to control to provide the photocurrents generated by the light sensing circuits to an input end of the conversion sub-circuit in a time division manner under the control of a light sensing control signal;
   the capacitor control sub-circuit is configured to control to connect first ends of the integrating capacitors to the input end of the conversion sub-circuit in a time division manner under the control of a capacitor control signal; second ends of the integrating capacitors are electrically connected to an output end of the conversion sub-circuit;
   the sampling control sub-circuit is configured to control to connect or disconnect the output end of the conversion sub-circuit and the processing circuit under the control of the sampling control signal;
   the conversion sub-circuit is configured to convert the photocurrent to obtain and output an analog output voltage through the output end of the conversion sub-circuit;
   the conversion parameter is a capacitance value of an integrating capacitor currently in connection with the input end of the conversion sub-circuit.

2. The light detection module according to claim 1, further comprising a reset circuit; wherein the reset circuit comprises M reset sub-circuits;
   an mth reset sub-circuit is respectively electrically connected to a first end of an mth integrating capacitor, a second end of the mth integrating capacitor and a reset control end, and is configured to control to connect a first end of the mth integrating capacitor and a second end of the mth integrating capacitor under the control of a reset control signal provided by the reset control end, to release charge stored in the mth integrating capacitor;
   m is a positive integer less than or equal to M.

3. The light detection module according to claim 1, wherein the light sensing control sub-circuit comprises N light sensing control transistors; the capacitor control sub-circuit comprises M capacitor control transistors; n is a positive integer less than or equal to N, and m is a positive integer less than or equal to M; the sampling control sub-circuit comprises a sampling switch and a storage capacitor;
   a control electrode of an nth light sensing control transistor is electrically connected to an nth light sensing control end, a first electrode of the nth light sensing control transistor is electrically connected to an nth photocurrent output end, and a second electrode of the nth light sensing control transistor is electrically connected to the input end of the conversion sub-circuit; the nth light sensing control end is used to provide an nth light sensing control signal;
   a control electrode of an mth capacitor control transistor is electrically connected to an mth capacitor control end, a first electrode of the mth capacitor control transistor is electrically connected to the input end of the conversion sub-circuit, and a second electrode of the mth capacitor control transistor is electrically connected to the first end of the mth integrating capacitor, the second end of the mth integrating capacitor is electrically connected to the output end of the conversion sub-circuit; the mth capacitor control end is used to provide the mth capacitor control signal;
   a control end of the sampling switch is electrically connected to the sampling control end, a first end of the sampling switch is electrically connected to the output end of the conversion sub-circuit, and a second end of the sampling switch is electrically connected to the processing circuit;
   a first end of the storage capacitor is electrically connected to the second end of the sampling switch, and a second end of the storage capacitor is electrically connected to a DC voltage end.

4. The light detection module according to claim 3, further comprising a filter circuit; wherein the filter circuit is connected between the output end of the conversion sub-circuit and the first end of the sampling switch, and is configured to filter out a high-frequency noise in the analog output voltage, and provide the analog output voltage after filtering out the high-frequency noise to the first end of the sampling switch.

5. The light detection module according to claim 2, wherein the mth reset sub-circuit comprises an mth reset transistor;
   a control electrode of the mth reset transistor is electrically connected to the reset control end, a first electrode of the mth reset transistor is electrically connected to the first end of the mth integration capacitor, and a second electrode of the mth reset transistor is electrically connected to the second end of the mth integrating capacitor.

6. The light detection module according to claim 2, wherein the N light sensing circuits, the light sensing control sub-circuit, the capacitor control sub-circuit, and the reset circuit are all arranged on a display substrate.

7. The light detection module according to claim 1, wherein a capacitance value of at least part of integrating capacitors is less than 10 pF, the at least part of integrating capacitors are arranged on the display substrate, and integrating capacitors other than the at least part of integrating capacitors comprised in the sampling sub-circuit are arranged on a circuit board or a driver integrated circuit.

8. The light detection module according to claim 1, wherein the conversion sub-circuit comprises an operational amplifier; an inverting input end of the operational amplifier is the input end of the conversion sub-circuit, an output end of the operational amplifier is the output end of the conversion sub-circuit;

a non-inverting input end of the operational amplifier is electrically connected to a reference voltage end, and the reference voltage end is configured to provide a reference voltage.

9. The light detection module according to claim 1, further comprising a control signal generating unit; wherein the control signal generating unit is configured to provide a sampling control signal, a light sensing control signal, a capacitor control signal and a reset control signal.

10. The light detection module according to claim 9, wherein the processing circuit comprises an analog-to-digital converter and an output processing unit;

the analog-to-digital converter is configured to convert the analog output voltage into an output digital signal;

the output processing unit is electrically connected to the analog-to-digital converter, and is configured to receive the output digital signal and obtain the characteristics of the light signal according to the output digital signal.

11. The light detection module according to claim 1, wherein the characteristics of the light signal comprise at least one of light intensity, brightness, color coordinates, or color temperature.

12. The light detection module according to claim 9, further comprising a micro-control unit; wherein the control signal generating unit comprises a control signal generating circuit and a level converter;

the control signal generating circuit is configured to provide a sampling control signal, an input light sensing control signal, an input capacitor control signal and an input reset control signal;

the level converter is electrically connected to the control signal generating circuit, and is configured to perform level conversion on the input light sensing control signal to generate the light sensing control signal, perform the level conversion on the input capacitor control signal to generate the capacitor control signal, and perform the level conversion on the input reset control signal to generate the reset control signal;

the output processing unit and the control signal generating circuit are arranged in the micro-control unit.

13. The light detection module according to claim 12, wherein the light detection module further comprises a filter circuit;

the micro-control unit, the level converter, the analog-to-digital converter, the filter circuit, and the conversion sub-circuit and the sampling control sub-circuit comprised in the capacitance integration conversion circuit are all arranged on the circuit board or the driver integrated circuit.

14. The light detection module according to claim 1, wherein the nth light sensing circuit comprises an nth photodiode; n is a positive integer less than or equal to N;

a cathode of the nth photodiode is electrically connected to a power supply voltage end, and an anode of the nth photodiode is used to provide an nth photocurrent;

the power supply voltage end is used to provide a power supply voltage signal.

15. A display device comprising the light detection module according to claim 1.

* * * * *